United States Patent
Lindvall et al.

(10) Patent No.: US 12,555,365 B2
(45) Date of Patent: Feb. 17, 2026

(54) SYSTEMATIC TESTING OF AI IMAGE RECOGNITION

(71) Applicant: FRAUNHOFER USA, INC., Plymouth, MI (US)

(72) Inventors: Mikael Lindvall, Greenbelt, MD (US); Rohan Reddy Mekala, Silver Spring, MD (US)

(73) Assignee: FRAUNHOFER USA, INC., Plymouth, MI (US)

( * ) Notice: Subject to any disclaimer, the term of this patent is extended or adjusted under 35 U.S.C. 154(b) by 348 days.

(21) Appl. No.: 18/243,508

(22) Filed: Sep. 7, 2023

(65) Prior Publication Data

US 2024/0087300 A1    Mar. 14, 2024

Related U.S. Application Data

(60) Provisional application No. 63/404,876, filed on Sep. 8, 2022.

(51) Int. Cl.
| | | |
|---|---|---|
| *G06V 10/00* | (2022.01) | |
| *G06V 10/77* | (2022.01) | |
| *G06V 10/774* | (2022.01) | |
| *G06V 10/776* | (2022.01) | |
| *G06V 10/82* | (2022.01) | |

(52) U.S. Cl.
CPC ........ *G06V 10/776* (2022.01); *G06V 10/7715* (2022.01); *G06V 10/774* (2022.01); *G06V 10/82* (2022.01)

(58) Field of Classification Search
CPC ............ G06N 3/02; G06N 3/08; G06N 3/042; G06N 3/045; G06N 3/047; G06N 3/082; G06N 3/092; G06N 3/0454; G06N 3/0475; G06N 3/0464; G06V 10/82; G06V 10/761; G06V 10/762; G06V 10/764; G06V 10/765; G06V 10/7715; G06V 10/776; G06V 10/778; G06V 10/774

See application file for complete search history.

(56) References Cited

U.S. PATENT DOCUMENTS

| | | | |
|---|---|---|---|
| 9,123,095 B2 * | 9/2015 | Lee ...................... | G06V 10/809 |
| 9,443,314 B1 * | 9/2016 | Huang .................. | G06V 20/35 |
| 10,467,504 B1 * | 11/2019 | Hamedi .................. | G06F 18/22 |

(Continued)

OTHER PUBLICATIONS

International Search Report and Written Opinion on PCT App. PCT/US2023/032135 dated Nov. 20, 2023 (15 pages).

*Primary Examiner* — Amir Alavi
(74) *Attorney, Agent, or Firm* — Foley & Lardner LLP

(57) ABSTRACT

Disclosed are systems and methods including software processes for developing test cases for testing robustness of AI-based image-recognition models-under-test (MUTs) with respect to types of image variation transformations. The system may generate various types of robustness metrics for the MUT and output user-readable reports about the MUT's performance. The system trains machine-learning architectures to generate test cases including augmented images according to the types of image transformations, applies the IR MUTs, and then evaluates the image feature vector embeddings and predicted classification produced by the IR MUTs to determine the accuracy of the MUT with respect to each type of transformation.

20 Claims, 8 Drawing Sheets

(56) References Cited

U.S. PATENT DOCUMENTS

| | | | |
|---|---|---|---|
| 10,719,731 B2 * | 7/2020 | Song | G06V 10/75 |
| 11,301,718 B2 * | 4/2022 | Hamedi | G06V 10/764 |
| 11,715,004 B2 * | 8/2023 | Zhang | G06N 3/04 |
| | | | 706/20 |
| 11,961,281 B1 * | 4/2024 | Kim | G06V 20/64 |
| 12,277,753 B1 * | 4/2025 | Bharaj | G06V 10/751 |
| 2015/0055855 A1 | 2/2015 | Alattar et al. | |
| 2015/0363670 A1 | 12/2015 | Sugishita et al. | |
| 2020/0167930 A1 | 5/2020 | Wang et al. | |
| 2020/0175352 A1 | 6/2020 | Cha et al. | |
| 2020/0349425 A1 | 11/2020 | Saha et al. | |
| 2023/0344868 A1 * | 10/2023 | Kaligotla | H04L 63/1416 |
| 2024/0087300 A1 * | 3/2024 | Lindvall | G06V 10/7715 |

* cited by examiner

| Cluster_Label (402) | Transformations (404) | | | | | | | | | | | | | | Majority True Class (406) | Percentage of Majority Class (408) | Percentage of Data Points (410) |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | | | |
| 0 | 0 | 0 | 0 | 0 | 0 | 0 | 0 | 0 | 0 | 0 | 0 | 0 | 0 | 0 | Horse | 72.0 | 7.22 |
| 1 | 0 | 1 | 1 | 0 | 1 | 0 | 0 | 0 | 0 | 0 | 0 | 0 | 0 | 0 | Cat | 75.0 | 8.02 |
| 2 | 0 | 1 | 0 | 1 | 1 | 1 | 0 | 0 | 1 | 1 | 0 | 0 | 0 | 0 | Ship | 19.0 | 17.67 |
| 3 | 0 | 0 | 1 | 0 | 0 | 0 | 0 | 0 | 0 | 0 | 0 | 0 | 0 | 0 | Ship | 90.0 | 7.10 |
| 4 | 0 | 1 | 1 | 0 | 1 | 1 | 1 | 1 | 1 | 0 | 0 | 0 | 0 | 1 | Bird | 45.0 | 11.06 |
| 5 | 0 | 0 | 0 | 0 | 0 | 0 | 0 | 0 | 0 | 0 | 0 | 0 | 0 | 0 | Deer | 81.0 | 6.80 |
| 6 | 0 | 0 | 0 | 0 | 1 | 1 | 1 | 1 | 1 | 1 | 1 | 1 | 1 | 1 | Car | 54.0 | 16.11 |
| 7 | 0 | 0 | 0 | 0 | 0 | 0 | 0 | 0 | 0 | 0 | 0 | 0 | 0 | 0 | Dog | 56.0 | 5.07 |
| 8 | 0 | 1 | 0 | 0 | 0 | 0 | 0 | 0 | 0 | 0 | 0 | 0 | 0 | 0 | Frog | 89.0 | 9.89 |
| 9 | 0 | 0 | 1 | 1 | 1 | 1 | 1 | 0 | 0 | 0 | 0 | 0 | 0 | 1 | Plane | 61.0 | 10.20 |

FIG. 4

SYSTEMATIC TESTING OF AI IMAGE RECOGNITION

CROSS-REFERENCE TO RELATED APPLICATION

This application claims priority to U.S. Provisional Application No. 63/404,876, entitled "Systematic Testing of AI Image Recognition," filed Sep. 8, 2022, which is incorporated by reference in its entirety.

TECHNICAL FIELD

This application generally relates to systems and methods for managing, training, and deploying a machine learning architecture for image recognition and image processing.

BACKGROUND

AI-based image recognition (IR) software and systems, especially those that are involved in safety-critical decision-making, must be thoroughly validated to ensure that image or object recognition models are robust with respect to inevitable variation in the characteristics of real-world images. Failure to develop IR software with non-robust models are vulnerable to misclassification, missed classifications, or other types of errors, which could yield far-reaching consequences.

Robustness generally refers to a model's capacity to resist faulty outputs in view of various types of complexities, variations, or degradations arising in the input data. In developing and training a model, the model should be trained on ordinary data and augmented data containing those variations. This approach to preparing training data having variations is sometime referred to as data augmentation. During testing, the model-under-test (MUT) should be tested on test data that includes test inputs having those types of variations to validate that the MUT is a robust against those types of variations.

Validating the robustness of such AI models is currently done with little to no software tool support, which wastes time and resources and limits the test quality. A tester is typically trying to collect as many image variations as possible. Most testing approaches use labeled images, but the images often must be manually labeled, which is very time consuming.

Oftentimes, the test images are used to test the MUT using test scripts. The test scripts pull the test images and feed the test images to the MUT, and then record whether the tests passed or failed with respect to adequately performing IR classifications of, for example, objects or faces in the test image. Test execution typically takes a long time and limits the number of images on which the MUT is tested. Test results are simplistic, manually examined, or focus solely on identifying the test images for which the MUT failed to properly classify. Current IR testing techniques provide little support for reasoning about test coverage making it difficult to determine how much of the MUT remains untested. Thus, the tester may "over-test" the MUT with potentially redundant test cases, or risk that the MUT, even after substantial testing, still has low quality and defects.

SUMMARY

Disclosed herein are systems and methods capable of addressing the above-described shortcomings and may also provide any number of additional or alternative benefits and advantages. Embodiments include systems and methods for developing test cases for testing robustness of IR MUTs with respect to types of image variations or transformations. A computing device of a MUT development system implements software programming of an AI-backed, tool-supported robustness software testing methodology (STAR) to facilitate the testing of the AI-models of the IR MUTs. The computer-executed STAR operations may be accessed or used by software testers to quickly, powerfully, and efficiently detect defects in capabilities of IR MUTs, thus increasing the quality, consistency, and accuracy of the MUT performance. The STAR operations may generate various types of metrics and output rich reports for the IR testers to review details about how the MUT performed, such as quantifiable robustness assurance metrics presented in an interactive user interface or file format with human-readable details. The STAR operations beneficially reduce the cost and effort to test and improve IR MUTs due to the features supports traceability and reproducibility in testing.

The STAR operations employ machine-learning architectures and AI models to test AI-based, IR MUTs. The STAR operations automatically create and execute test cases (TCs) in a fast, intelligent, and iterative fashion to efficiently ensure and repeatably document that quantifiable robustness testing objectives have been satisfied, while providing testers with important testing details. The machine-learning architecture includes layers for latent feature extraction that extracts latent features from the test images at the feature-level causes of MUT-robustness. In some cases, the machine-learning architecture may determine an optimal amount of TCs and transformations needed to accurately and quickly evaluate robustness of the MUT during deployment or inference time. The STAR software includes layers of the machine-learning architecture for creating the TCs through whole image transformations (e.g., rotating and blurring), and object transformations (e.g., adding facial hair or receding hair lines). The STAR operations employ a model-based testing (MBT) technique that drastically reduces testing time by using layers of the machine-learning architecture that include AI-models trained to predict the testing results of the IR MUT, when testing the MUT's capacity to classify images and robustness to the relevant types of image transformations that cause types of variations in images.

In some embodiments, a computer-implemented method of using artificial intelligence models for determining robustness of image-recognition artificial intelligence models. The method comprises: receiving, by a computer, one or more robustness thresholds, one or more input training images, and one or more types of transformations; for each of the input training images, generating, by the computer, one or more transformed training images according to the one or more types of transformations applied on the input training image, thereby generating a plurality of training images; for each training image of the plurality of training images, applying, by the computer, a model-under-test (MUT) on the training image to generate one or more training labels corresponding to the training image and a robustness value; for each training image, extracting, by the computer, a plurality of features by applying a feature extraction engine on the training image; and training, by the computer, a robustness classification model to generate a robustness likelihood score for the MUT according to the one or more robustness thresholds and one or more loss functions, by applying parameters of the robustness classification model on the plurality of features extracted for the plurality of training images and the corresponding plurality of training labels, and adjusting the robustness likelihood score in accordance with the one or more robustness thresholds.

In some implementations, the method includes receiving, by the computer, from a client computer, an input testing image and a selection of the one or more types of testing transformations; generating, by the computer, one or more test cases by applying the one or more types of testing transformations on the input testing image, thereby generating one or more transformed testing images for the one or more test cases, each respective test case of the one or more test cases includes a transformed testing image of the one or more transformed test images and a type of testing transformation applied to the testing image; for each test case, applying, by the computer, the MUT on the transformed testing image of the test case to generate one or more labels corresponding to the transformed testing image and a robustness value; for each test case, extracting, by the computer, a plurality of features by applying the feature extraction engine on the transformed testing image; and generating, by the computer, one or more robustness likelihood scores for the MUT by applying the robustness classification model on the plurality of features extracted for each transformed testing image and the one or more labels corresponding to the transformed testing image and the robustness value.

In some implementations, the method includes determining, by the computer, an amount of transformations for testing the MUT based upon one or more robustness thresholds obtained with the input testing image.

In some implementations, applying the MUT on each particular training image to generate the robustness value corresponding to each training label includes: for each input training image, generating, by the computer, a robustness vector comprising one or more robustness values based upon comparing the training label of the input training image against each training label of each transformed training image generated for the input training image.

In some implementations, training the robustness classification model includes: down-sampling, by the computer, dimensionality of the training image according to a set of neural network layers defining an encoder of the feature extraction engine; extracting, by the computer, a first instance of the set of features for the training image; up-sampling, by the computer, the dimensionality of the training image by applying a set of neural network layers defining a generative decoder, thereby generating a reconstructed training image; and adjusting, by the computer, one or more parameters of the feature extraction engine according to a loss function using the reconstructed training image.

In some implementations, training the robustness classification model further includes: down-sampling, by the computer, dimensionality of the training image according to the set of neural network layers defining the encoder of the feature extraction engine; extracting, by the computer, a second instance of the set of features for the training image; applying, by the computer, a set of neural network layers defining a classifier decoder of the robustness classification model, to generate the robustness likelihood score; and adjusting, by the computer, one or more parameters of the feature extraction engine according to a second loss function using the robustness likelihood score and the training label corresponding to the training image.

In some implementations, training the robustness classification model further includes: determining, by the computer, that the robustness classification model satisfies a training threshold based upon a distance between the robustness likelihood score predicted for the features extracted for the training image and the training label.

In some implementations, the method includes generating, by the computer, one or more clusters by applying a clustering function on the plurality of features extracted for the plurality of training images; and for at least one training image, determining, by the computer, one or more distance scores between the plurality of features extracted from the at least one training image and the one or more clusters.

In some implementations, the method includes receiving, by the computer, the one or more types of transformations via a graphical user interface of a user device, including at least one of a feature-level transformation, an image-level transformation, an instance-level transformation, or a background style transformation.

In some implementations, the robustness value of the training label is 0, 1, or within a range of 0 to 1.

In some embodiments, a computer-implemented method of using artificial intelligence models for determining robustness of image-recognition artificial intelligence models. The method comprises: receiving, by a computer, one or more robustness thresholds, one or more input testing images, and one or more types of transformations; for each of the input testing images, generating, by the computer, one or more transformed testing images according to the one or more types of transformations applied on the input testing image, thereby generating the one or more transformed testing images and one or more test cases for the input testing image, each respective test case includes a transformed testing image and a type of transformation applied on the transformed testing image; for each test case, applying, by the computer, a model-under-test (MUT) on the transformed testing image to generate one or more labels corresponding to the transformed testing image and a robustness value; for each test case, extracting, by the computer, a plurality of features by applying a feature extraction engine on the transformed testing image; generating, by the computer, one or more robustness likelihood scores for the MUT according to the one or more robustness thresholds by applying a robustness classification model on the plurality of features extracted for each transformed testing image and the one or more labels corresponding to the transformed testing image and the robustness value.

In some implementations, the method includes determining, by the computer, an amount of transformations for testing the MUT based upon the one or more robustness thresholds.

In some implementations, the method includes: generating, by the computer, one or more clusters by applying a clustering function on the plurality of features extracted for the plurality of testing images; and for at least one testing image, determining, by the computer, one or more distance scores between the plurality of features extracted from the at least one testing image and the one or more clusters.

In some implementations, the method includes generating, by the computer, a user interface for displaying the one or more robustness likelihood scores for the MUT and the one or more clusters.

In some implementations, the method includes receiving, by the computer, the one or more types of transformations via a user interface of a user device, including at least one of a feature-level transformation, an image-level transformation, an instance-level transformation, or a background style transformation.

In some implementations, the method includes: receiving, by a computer, one or more input training images and the one or more types of transformations; for each of the input training images, generating, by the computer, one or more transformed training images according to the one or more types of transformations applied on the input training image, thereby generating a plurality of training images; for each training image of the plurality of training images, applying, by the computer, the MUT on the training image to generate one or more training labels corresponding to the training image and a robustness value; for each training image, extracting, by the computer, the plurality of features by applying the feature extraction engine on the training image; and training, by the computer, the robustness classification model to generate the robustness likelihood score for the MUT according to the one or more robustness thresholds and one or more loss functions, by applying the parameters of the robustness classification model on the plurality of features extracted for the plurality of training images and the corresponding plurality of training labels.

In some implementations, the robustness value of the training label is 0, 1, or within a range of 0 to 1.

In some implementations, training the robustness classification model further includes: down-sampling, by the computer, dimensionality of the training image according to a set of neural network layers defining an encoder of the feature extraction engine; extracting, by the computer, a first instance of the set of features for the training image; up-sampling, by the computer, the dimensionality of the training image by applying a set of neural network layers defining a generative decoder, thereby generating a reconstructed training image; and adjusting, by the computer, one or more parameters of the feature extraction engine according to a loss function using the reconstructed training image.

In some implementations, training the robustness classification model further includes: down-sampling, by the computer, dimensionality of the training image according to the set of neural network layers defining the encoder of the feature extraction engine; extracting, by the computer, a second instance of the set of features for the training image; applying, by the computer, a set of neural network layers defining a classifier decoder of the robustness classification model, to generate the robustness likelihood score; and adjusting, by the computer, one or more parameters of the feature extraction engine according to a second loss function using the robustness likelihood score and the training label corresponding to the training image.

In some implementations, the method includes training the robustness classification model further includes: determining, by the computer, that the robustness classification model satisfies a training threshold based upon a distance between the robustness likelihood score predicted for the features extracted for the training image and the training label.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 4 shows a chart containing robustness metrics results for a k-means clustering module, according to an embodiment.

DETAILED DESCRIPTION

Figure 1A:
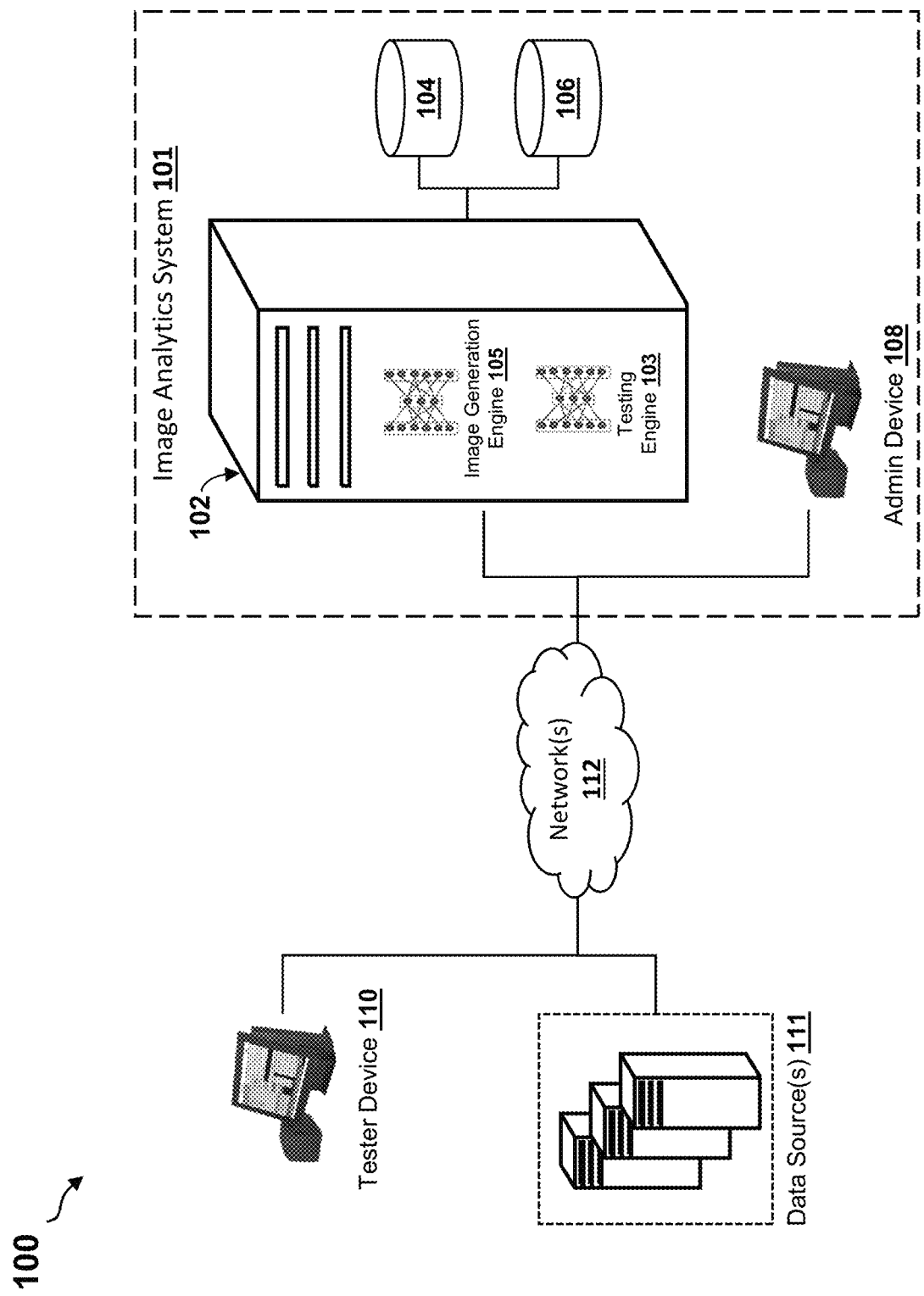
FIGS. 1A-1B shows components of a system for developing test cases and testing and evaluating robustness of image processing models using STAR software programming, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Validating the robustness of AI-based IR models is a complex and poorly understood problem with limited standard or conventional solutions. Performing exhaustive robustness testing of IR MUTs manually, without the support of powerful test automation tools, is both ineffective and computationally expensive. One reason for this is that robustness testing requires very large sets of test cases of labeled images in order to adequately and cost-effectively prod against the predictive capabilities of the IR MUT. A test case includes a test image and one or more transformations (e.g., rotation, changing background style, object position or adding facial hair) to be implemented for testing the robustness characteristics of the MUT. The TCs must include many different variants of the test images, across various different transformations for which the MUT is developed or expected to handle. The TCs may also account for the many image variations that will occur due to, for example environmental conditions, mechanical wear on cameras, and malicious image manipulations, among others. Since the number of potential image "states" is enormous, manually creating, running, and analyzing these TCs in a systematic fashion is infeasible with conventional approaches.

To address these issues, embodiments described herein include computer implementing software programming implementing STAR operations, including layers and functions of machine-learning architectures, for systematic development of test cases and testing IR MUTs. The STAR operations automatically create and execute the TCs in an intelligent and iterative fashion to efficiently ensure and repeatably document quantifiable robustness metrics and validate whether robustness testing objectives of the MUT are satisfied. The STAR operations implement the MBT approach that reduces testing time by using AI-models to accurately predict the testing results for the MUT. With this information, testers can then direct STAR operations to run specific tests likely to demonstrate actual errors in the MUT's outputs.

Generally, in MBT approaches, the tester manually builds a test model of the MUT and uses the test model to create test cases. Alternatively, the tester tests the manually built test model instead of, or before, testing the MUT. STAR operations leverage these MBT approaches. However, instead of manually creating a model of the MUT, the STAR operations automatically create the test model. The STAR operations use the created test model to automatically create the test cases, and then uses the test cases to test the MUT. In some circumstances, this may take time, especially for very large numbers of TCs, and so the STAR operations allow the tester to preliminarily test against the AI-guided test model quickly to gather a very accurate prediction of what the testing results would be. The tester can then adjust the testing objectives (e.g., one or more training or performance thresholds) based on the prediction to achieve the tester's desired objectives. Using the STAR operations, the tester can also use a small sample of the test cases to preliminarily test the MUT and automatically verify, for the sample, that the predicted test results match the actual test results. When the tester is convinced that the testing configuration will be successful and cost-effective, the tester can then proceed with further testing. For example, the tester can proceed with another set of quick iterative regressions runs or continue with very large-scale testing using a large suite of test case against the MUT.

Embodiments may address the problems of creating, executing, analyzing, and reproducing the test cases needed to quantitatively establish the robustness of the MUT. The STAR operations may automate functions for identifying the robustness metrics and performance for a given MUT in a fast and efficient manner. In some instances, embodiments may be used for regular image-based testing. For instance, the STAR operations may test whether the MUT correctly classifies an untransformed "basic" labeled image. The STAR operations use latent features extracted from the images to detect weak areas as performance vulnerabilities unaccounted for by the MUT. In some implementations, the STAR operations include AI-models that identify a minimal number of TCs that are needed to meet a robustness testing objective defined as an objective threshold by the tester, which the tester may provide, via a dashboard user interface, to the server executing the STAR operations in the form of configuration instructions for configuring the MUT-testing session.

Embodiments may address shortcomings in providing testers informative testing reports, and problems around testers being unable to consistently, quickly, and accurately reproduce failing test cases that the MUT developers may investigate. The STAR operations generate and provide the tester with quantitative and qualitative feedback, including measures of robustness, test/fail criteria, and traceability to individual test case results. Since testers often lack access to the MUT's "black box" model architecture, the training data, or other aspects of the MUT-testing environment, the STAR operations do not require such data. The STAR operations may provide the tester with images related to, for example, certain subject matter domains (e.g., Maritime, Aircraft, Ground, Faces, General subject matter). These are merely examples, as the STAR operations are flexible to various domains and IR objectives, and thus embodiments of the software programming may be configured and trained for any number of additional or alternative domains, and any number of images and domains can be added.

Embodiments include a computing device that executes one or more machine-learning architecture comprising layers or functions for performing various functions, such as extracting latent feature embeddings from images and classifying robustness capabilities of MUTs, among other potential sub-component engines, layers, or functions of the machine-learning architectures. In some embodiments, the machine-learning architecture constitutes multiple, distinct machine-learning architectures. In some embodiments, the machine-learning architecture includes a single, integrated machine-learning architecture. For ease of description, the machine-learning architecture some embodiments are described as constituting a single machine-learning architecture. The server executes the software routines of the layers and functions of the machine-learning architecture in various operational status phases, including a training phase and a deployment phase (sometimes referred to as the "testing phase" or "production phase"). In some embodiments, the STAR software programming may include a layers and functions of a machine-learning architecture defining, for example, a Test Case Generation and Execution Environment (sometimes referred to as "testing engine"), and a Generative AI for Object Transfiguration Augmentation (sometimes referred to as an "image generator"). The testing engine uses image-level transformations and feature-level transformations, from the image generator, to rapidly and effectively augment an initial set of training images to create and apply a large number of test cases having broad testing coverage for detecting strengths and weaknesses with the MUT. Using these two components, the STAR operations beneficially deliver an efficient testing mechanism that uses underlying latent features of the image distribution to intelligently create, execute, and analyze test cases that target testing for likely sources of robustness shortcomings in the MUT.

FIG. 1A shows components of a system 100 for developing, testing, and evaluating robustness of image processing models using Systematic Testing of AI Image Recognition (STAR) software programming. The system 100 comprises STAR servers 102, STAR databases 104, image databases 106, and various user client devices 108, 110, including client devices of administrative users (referred to as admin devices 108) and client devices of tester-users (referred to as tester devices 110). The various components of the system 100 communicate via one or more networks 112. Embodiments may comprise additional or alternative components or omit certain components from those of FIG. 1, and still fall within the scope of this disclosure. It may be common, for example, to include multiple to have multiple STAR servers 102, admin devices 108, and tester devices 110, among others. Embodiments may include or otherwise implement any number of devices capable of performing the various features and tasks described herein. For example, the FIG. 1 shows the STAR server 102 in as a distinct computing device from the STAR database 104 and image database 106, but in some embodiments, the STAR database 104 or the image database 106 may be integrated into the STAR server 102.

The networks 112 include various hardware and software components of one or more public or private networks 112. The networks 112 may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The STAR server 102 may be any computing device comprising one or more processors and software, and capable of performing the various processes and tasks described herein. Non-limiting examples of the STAR server 102 may include personal computers (e.g., workstation computers, laptop computers), server computers, and tablet devices, among others. Although FIG. 1 shows only single STAR server 102, the STAR server 102 may include any number of computing devices. In some cases, the computing devices of the STAR server 102 may perform all or sub-parts of the processes and benefits of the STAR server 102. The STAR server 102 may comprise computing devices operating in a distributed or cloud computing configuration and/or in a virtual machine configuration.

The STAR server 102 may host or be in communication with the STAR database 104 and the image database 106. The STAR server 102 (or other device of the system 100) receives and processes the image data of images obtained (e.g., received, retrieved) from any number of data sources via the one or more networks 112. Non-limiting examples of the data sources may include the STAR database 104, the image database 106, uploads from the admin devices 108 or the tester devices 110, websites hosted by webservers internal to the computing networks 112 having the STAR server 102, or websites hosted by webservers external to the computing networks 112 not having the STAR server 102, among other computing-based data sources.

The STAR server 102 may execute various software-based processes on image data, such as processes for image or object recognition and data augmentation (e.g., applying transformations on the image data of the image), among others. The STAR server 102 executes software for machine-learning architecture, which includes layers and functions for machine-learning models and techniques to perform the image recognition and data augmentation. For example, in some embodiments, the layers of the machine-learning architecture include one or more neural network architectures for image recognition and for generating test cases, and data augmentation layers for applying the various types of image transformation on the image data. The analytics server 102 applies the various machine-learning architecture(s) on the image datasets in accordance with a corresponding operational phase of the machine-learning architecture, such as a training phase or a deployment phase (sometimes referred to as "testing," "inference time," or "production"). For example, the inputted image data may be a training image dataset, an augmented training image dataset (including the initial image dataset and the image dataset having transformation applied), or test image data for testing a MUT, among other types of image data.

The software programming executed by the STAR server 102 includes the one or more machine-learning architectures, including executable layers or functions defining test case generation and execution engines (sometimes referred to as testing engines 103), and image generation and augmentation engines (sometimes referred to as image generators 105). In operation, the testing engine 103 uses image-level transformations and feature-level transformations of images, from the image generator 105, to rapidly and effectively augment an initial set of training images, which may be stored in the image database 106 or received from the tester device 110 or other data source 111. The testing engine 103 applies the various types of transformations on the training images to create a large amount of augmented images employed as further training images or as testing images for test cases having substantially greater test coverage when testing the capabilities of a MUT, thereby providing higher probability of detecting or identifying deficiencies or strengths in the MUT's robustness towards the types of transformations. The testing engine 103 references testing images, comprising the initial images and the set of training images having image-level transformations, to predict robustness characteristics of the image classification accuracy or consistency of the MUT.

The testing engine 103 develops, selects, and implements the created test cases to test the robustness of the MUTs. The testing engine 103 further includes programming for testing the MUT robustness and generating various robustness metrics for the particular MUT. The testing engine 103 employs an AI-based approach to analyze and identify latent features of the image data of each of the test cases. The testing engine 103 references the results from the initial testing of the particular MUT, together with the identified latent features, to detect or evaluate robustness-specific areas of strength and weaknesses in the MUT (e.g., types of transformations that the MUT handles or is resistant to; types of transformations that the MUT is vulnerable to or confuses the MUT). The testing engine 103 may apply the types of transformations to rapidly and effectively create the minimal number of test cases that provably stress and evaluate the robustness of the MUT. The testing engine 103 may output, for example, various robust metrics generated by applying the RCM 131 on the outputs of the MUT.

The image generator 105 increases the data-augmentation coverage of the types of image-data transformations that could be applied to images, and systematically increases the amount of test cases for testing the robustness of the MUTs using the various types of transformations. In some cases, the image generator 105 applies a range of feature-level transformations to images. The feature-level transformations applied to an image include, for example, non-linear image feature variations (e.g., image changes that mimic the influence of weather or season changes, image changes that misalignment of optical cameras). Additionally or alternatively, the feature-level transformations applied to an image may include more intricate feature variations, such as adding an object, positionally displacing the object, or removing the object within an image (e.g., adding a ship; moving a car; removing a person; adding sunglasses to a human face; changing emotions on a human face). By applying the testing engine 103 and the image generator 105, using parallelized computations, an embodiment of the STAR server 102 could create millions of test cases that collectively covered a very large space of possible image variations quickly (in less than 120-minutes) while detecting a large number of defects.

The STAR database 104 contains various types of data or information associated with testing and improving the MUTs. Non-limiting examples of the types of data or information stored in the STAR database 104 include various trained machine-learning architecture layers and models (e.g., RCMs 131, MUTs), training images, augmented images, and types of transformations, test cases generated and referenced by the testing engine 103, robustness metrics for the MUTs, and outputted reports containing robustness metrics for a MUT's robustness performance, among others. The STAR database 104 may be hosted by any computing devices comprising hardware (e.g., non-transitory machine-readable storage, processor, network interface) and software components (e.g., database management software) capable of performing the various processes described herein.

The image database 106 contains one or more corpora of image datasets. The image database 106 may be hosted by any computing devices comprising hardware (e.g., non-transitory machine-readable storage, processor, network interface) and software components (e.g., database management software) capable of performing the various processes described herein. The image database 106 includes any number of corpora of training image data or testing image data that are accessible to the STAR server 102 via one or more networks 112. In some embodiments, the STAR server 102 employs supervised training to train the machine-learning architectures, where the image database 106 includes labels associated with the image data to indicate, for example, types of transformation applied to the image of the image data. The STAR server 102 may also query or crawl external data sources 111, such as a website or third-party database, containing a corpus of image datasets. An administrator-user of the analytics system 101 may configure the STAR server 102 to obtain (e.g., receive, retrieve, generate) the images, image data, or image datasets, and to apply the types of transformations on the image datasets to generate the additional augmented image data.

The admin device 108 allows administrative user personnel of the image analytics system 101 to manage operations of the STAR server 102 or other components of the system 100. The admin device 103 may be any computing device comprising a processor and software, and capable of performing the various tasks and processes described herein. The admin device 108 includes software programming allowing personnel of the image analytics system 101 to trigger and control user-prompted analytics operations (e.g., selecting MUTs for testing; initiating MUT testing), or perform various administrative tasks (e.g., configuring the image datasets; selecting the image transformations; configuring operations of machine-learning architecture the STAR server 102). Non-limiting examples of the admin device 103 may include a server, personal computer, laptop computer, tablet computer, or the like.

The tester device 110 allows tester-users to access and operate image processing features of the image analytics system 101 to test the MUTs of the tester. The tester device 110 may be any computing device comprising a processor and software, and capable of performing the various tasks and processes described herein. The tester device 110 includes software programming allowing the tester to trigger and control user-prompted analytics operations (e.g., selecting MUTs for testing; initiating MUT testing) by the STAR server 102. In some cases, the tester device 110 may allow the tester to perform various administrative tasks for managing or configuring functions of the STAR server 102 with respect to testing the tester's MUTs. Non-limiting examples of the tester device 110 may include a server, personal computer, laptop computer, tablet computer, or the like.

In some cases, the image generator 105 is user-configurable via the admin device 108 and/or the tester device 110, such that a user (e.g., administrator, tester) selects or indicates the types of transformations applied to image data. The user operates a user interface of the admin device 108 or the tester device 110 to submit the configuration instructions to the STAR server 102 and the image generator 105 via the one or more networks 112.

Figure 1B:
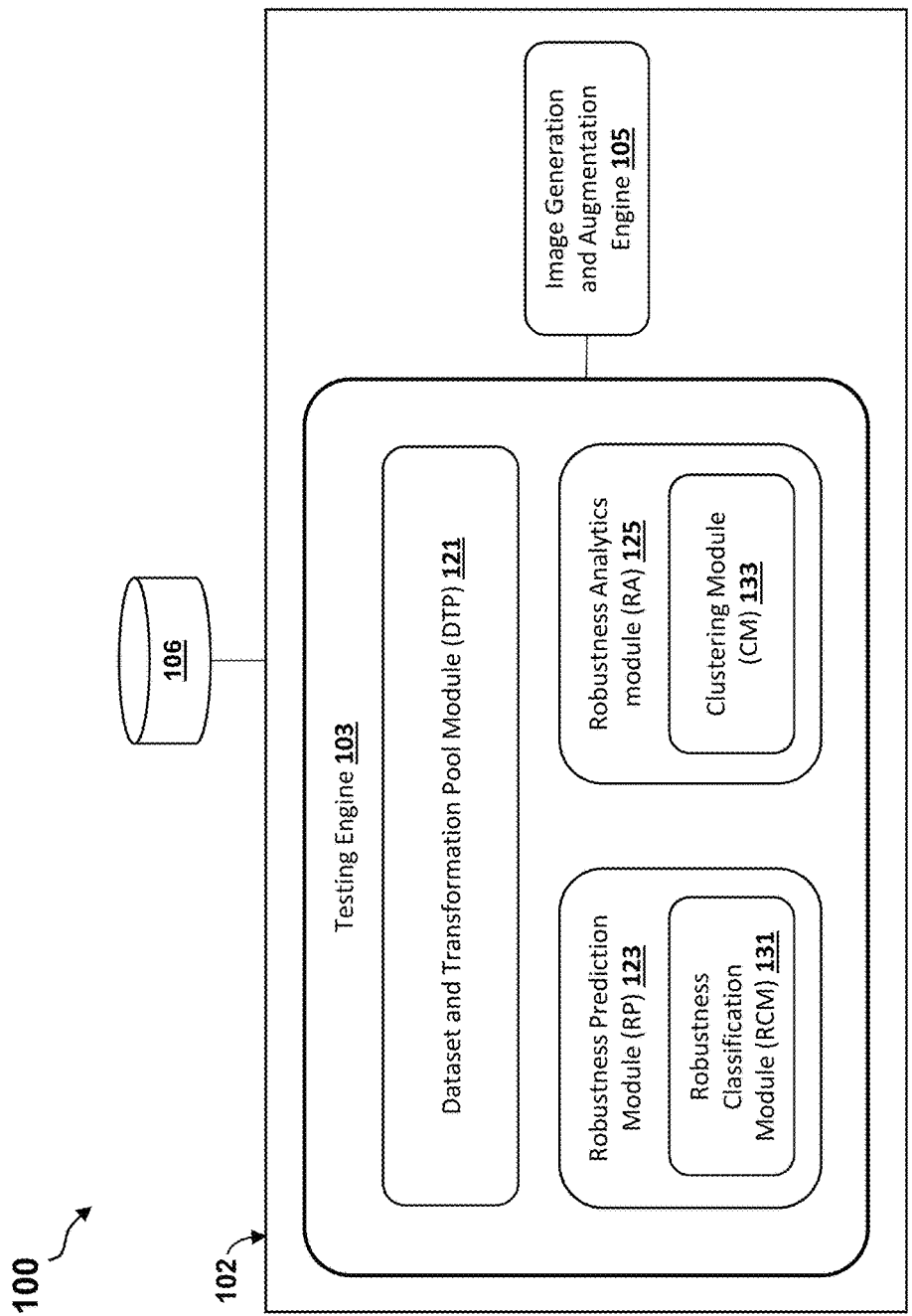

FIG. 1B shows certain software components of executed by the STAR server 102 of the system 100, including software programming defining certain sub-components of the testing engine 103 and the image generator 105. The testing engine 103 includes a Dataset and Transformation Pool (DTP) module (DTP module 121), a Robustness Prediction (RP) module (RP module 123), and a Robustness Analytics (RA) module (RA module 125). The RP module 123 includes a Robustness Classification Module (RCM 131), and the RA module 125 includes one or more Clustering Modules (CMs 133).

The testing engine 103 implements a metaheuristic-based, AI-guided approach to intelligently guide the processes for testing the robustness of MUTs, which includes generating and feeding the test cases to MUTs and RP module 123 for evaluating the robustness of the MUTs. The MUTs may be programmed and trained to perform image processing operations and image recognition objectives, including image classification, object detection, and facial recognition, The testing engine 103 generates the test cases for testing and evaluating how well the MUTs perform those objectives and how well the MUTs resist errors or adapt to changes in the image data. The testing engine 103 formulates the test cases by applying the various types of transformations on initial testing image data.

The DTP module 121 produces and uses domain-specific or image-recognition objective-specific labeled datasets, along with relevant metadata and transformations, for use in training models for robustness evaluation of the MUTs for the relevant domain or objective. The DTP module 121 may generate the image data and augmented image datasets by applying the various the types of transformations on the initial image data from the image database 106. The DTP module 121 then stores the initial image data and the augmented image data into the image database 106 or the STAR database 104.

The RP module 123 produces, trains, and uses an AI-based RCM 131 to determine an optimal or minimum number of transformations needed to exploit and test vulnerabilities of the MUT, such as feature-level causes of MUT-robustness (or lack thereof), with respect to the test cases of interest. The RP module 123 (or other software routine executed by the STAR server 102) determines an optimal number of test cases, transformed testing images, and/or types of transformations needed using the machine-learning techniques based upon latent features of the RCM and the classification model outputs. The RP module 123 iteratively synthesizes (i.e., creates) new images based on active learning techniques, extracts latent features from the images, and predicts the minimum amount of transformations and/or test cases needed to quantify the robustness characteristics of the MUT, based on optimal (pre-determined or manually set) performance thresholds. In some implementations, the RP module 123 may identify or select new types of transformations, based on iterative learning for points and regions of high-confidence variance, to detect weak spots in the MUT. The RP module 123 may then create new test cases based on available transformations, stored as models in the STAR database 104, for further exploring these weak spots of the MUT. Beneficially, the RP module 123 offers this predictive approach for identifying and applying possible test cases during robustness evaluations that drastically reduces the time needed for robustness evaluations. The STAR server 102 need not execute all possible transformation operations during runtime, reducing demand and increasing throughput in automated MUT validation.

The RA module 125 uses the results of the RCM 131 to create detailed correlation analyses between classes/latent features corresponding to a test image and the root-cause image augmentations causing maximum disruption in the MUT's robustness. The test cases (including, e.g., transformed images of an initial image, types of transformations, and/or robustness values) are used to test robustness of MUT by evaluating MUT outputs against the trained model of the RCM. In some configurations, the training image transformation pairs (e.g., X, R) (described further below) of the training images that are used to train the RCM are not repurposed or reused as test cases. These latent features extracted from images as part of the RP module 123 encode the feature level semantics, explaining the presence or lack of robustness of the MUT for a given test case. Using these latent features, the RA module 125 employs CMs 133 to systematically group the latent distribution into demarcated clusters, representing commonly occurring classes or transformation-level patterns of robustness behavior in the MUTs, such as the types of transformations that are difficult for the MUTs to handle. The CM 133 may group test cases together and identify, for example, common robustness characteristics. The CM 133 and RA module 125 may generate reports for display at the user interface of the admin device 108 and/or tester device 110 indicating, for example, the robustness behavior of the MUT(s) in a latent feature space, where the identified clusters provide insights on the robustness patterns of a MUT's capabilities and performance, at a transformation-level (e.g., transformation applied to the image), class-level (e.g., objects to be recognized and classified in the image), and overall model-level (e.g., accuracy or consistency of classifications by the MUT).

In some implementations, the STAR server 102 develops and trains software and data components for the testing engine 103 according to several functional operations or tasks, such as Dataset and Transformation Pool Development, RP module 123 Development, and RA Module 125 Development.

Dataset and Transformation Pool Development Functions ("Data Development")

In the Data Development functions, the STAR server 102 develops labeled images for the image database 106 for training and evaluation of MUTs and RP modules 123. In the example embodiment, the Data Development functions are generally performed by the DTP module 121 of the testing engine 103.

In operation, the STAR server 102 obtains a labeled dataset comprising any number of images. The labeled image datasets may be manually or automatically obtained from any number of public or private data sources 111. In some cases, the DTP module 121 receives image data as inputs or uploads as entered by a user (e.g., administrator, tester) operating the STAR server 102 or remote the client device (e.g., admin device 108, tester device 110). The user may upload the image data to the STAR server 102 or image database 106, or the user may enter a uniform resource identifier (URI) or uniform resource link (URL) that directs the STAR server 102 to a storage location (e.g., website or image database 106) of the data source 111 containing the image data.

The labeled image dataset includes the image data for any number of images, and metadata related to the image data. The labels associated with the image data for the images in the dataset includes at least a portion of the metadata related to the image data. In some cases, the server obtains the image data and the metadata from the data source. In some cases, the administrator or tester reviews the image data and enters the metadata and/or the labels at a user interface dashboard, allowing the administrator to indicate which portion of the metadata the STAR server 102 and machine-learning architectures should treat as the labels or to manually insert the labels into the image data files containing the image data of the image dataset. The administrator may establish and store the configurations indicating the metadata used as the labels into the STAR database 104 or image database 106, allowing the STAR server 102 to obtain (e.g., receive, retrieve, generate) additional image data having the labels according to the configurations. The metadata associated with the image data set contains various types of information about the image data and the images encoded within the image data. The metadata of an image data file of an image indicates, for example, filename, data source, domain and/or image recognition objectives (e.g., image classification, object detection, and face recognition), and types of transformation applied for data augmentation and robustness training, among others.

Optionally, the STAR server 102 segregates and stores the image datasets along with associated metadata related to, for example, the domain or image-recognition objective (e.g., image classification, object detection, and face recognition). The DTP module 121 or other software of the STAR server 102 references the metadata as tags or training labels for the segregated groups of image datasets.

The DTP module 121 applies the transformations on an initial image dataset to produce an augmented image dataset corresponding to the initial image dataset. Beneficially, the DTP module 121 relieves the tester from having to identify a large number of images for transformation or testing the MUT. The tester may, for example, indicate a small number of relevant images for the DTP module 121. The DTP module 121 may then systematically identify additional initial images and/or generate a large number of additional initial augmented images that are required for robustness testing.

The DTP module 121 or other component of the STAR server 102 may continue developing a pool of various types of transformations, which may be referenced and applied during robustness testing. During the testing phase, the STAR server 102 applies the pool of transformations against test images corresponding to a particular MUT. Additionally, the STAR server 102 controls application of the types of transformations on new image datasets, such that new augmented images remain realistic. In some implementations, for the new augmented image data, the STAR server 102 produces unchanged label outputs that are eventually fed to the MUT. The STAR server 102 may store the pool of transformations into the same or different database as the image dataset (e.g., STAR database 104, image database 106). During testing, the STAR server 102 may retrieve the pool of transformations to apply the types of transformation on testing image data to test the MUT and detect areas of robustness where the MUT is weak.

The transformation pool comprises a large amount of types of transformations, which may be developed as part of training and developing the image generator 105. Non-limiting examples of the types of transformations include Linear Transformations, Non-Linear transformations, Adversarial Perturbations, Feature-Level Synthetic Transformations, and Background Transformation, among others. The linear transformations include, for example, image-level affine transformations (e.g., rotation, translation, scaling), among others. The non-linear transformations include, for example, AveragePool, MinPool, JPEG Compression, and various forms of noise-based transformations, among others. The adversarial perturbations may include human-imperceptible noise, added to the images to cause targeted MUT misclassifications. These transformations will include a range of adversarial attacks, such as Fast Gradient Sign Attack (FGSM), Multi-Step Projected Gradient Descent (MS-PGD), and a Carlini-Wagner Attack (CW), among others. The feature-level synthetic transformations include, for example, synthetic transformations of face attribute semantics, object semantics, and background style level.

The DTP module 121 references and applies the types of transformations of the pool of transformations to create photorealistic transformed augmented images. The transformations result in feature-level changes in the initial images used to test the target MUT. The pool of transformations allows the DTP module 121 to manipulate the image data to inject complex characteristic changes in objects within the initial image data. For instance, the DTP module 121 applies one or more transformations on images, such that the resulting augmented image data having feature-based transformations on the images, simulating, for example, season transfer, day-to-night transfer, face attribute morphing, and object level transformations, such as object displacement, addition and removal. The STAR server 102 then stores the initial image dataset and the corresponding augmented image dataset generated by the DTP module 121 into the image database 106.

RP Module Development

During the RP Module 123 Development, the STAR server 102 develops, trains, and validates components of the RP module 123 for evaluating the robustness of the MUTs. The STAR server 102 trains layers and functions of a machine-learning architecture of the RP module 123, including training the RCM 131 to classify robustness capabilities of the MUTs and generate the robustness metrics of the MUTs, training the classifier of the RCM 131, and training feature extraction engine ("feature extractor"). Additional description and examples for the RP module 123 is provided in FIG. 3. The RP module 123 stores the trained RCM 131 and other features into the STAR database 104 for reference in later testing or training operations.

RA Module Development

During the RA Module 125 Development, the STAR server 102 uses the RCMs 131 (resulting from the RP Module 123 Development) to develop outputs or reports for the RA module 125, which may include an interactive dashboard user interface for display at the user interface of the tester device 110. The dashboard user interface allows testers to gain a detailed understanding of the feature-level transformations for which the MUT is or is not robust, at an image, transformation, class, and overall MUT model level. In some embodiments, to further help the tester identify robustness patterns in a large testing dataset, the CM 133 of the RA module 125 performs unsupervised cluster algorithms to generate one or more clusters, using the latent feature vector22rainings extracted for the testing images by the RCM 131. The RA module 125 uses the clusters obtained from the CM 133 to identify patterns of robustness behavior of the MUT on a transformation level and class level. The RA module 125 may include information about these patterns in the outputted report provided to the tester via the dashboard user interface or other data or file format. Additional description and examples of the RA module 125 is provided in FIG. 3. Additional description and examples of the CM 133 is provided in FIG. 4.

Turning to the image generator 105, the image generator 105 includes software programming of a machine-learning architecture for generating a diverse set of augmented images (e.g., augmented testing images, augmented training images) for training components of the machine-learning architecture (e.g., training the RCM 131) or testing the MUT. The image generator 105 addresses the tester's need to create large numbers of diverse test cases (e.g., image data, features, transformations), as variations in objects or features within an image could hamper the robustness of MUT's image-recognition model. For instance, environmental conditions, such as wearing of glasses, tanning skin color, the presence or absence of facial hair, irrelevant objects, change of seasons/time of day, addition or displacement of objects, and shadows, among others, could significantly impact the robustness of the MUT and should be tested for vulnerabilities in the MUT's robustness performance. For example, a MUT trained for face recognition is typically expected to work well (e.g., accuracy and consistently predict classifications of people's faces), even though the face images are aged and thus no longer perfectly matches the subject-person's face. Manually procuring real-world test cases for possible variants is tedious and logistically impossible to do in a structured way. In addition, image level transformations, such as rotating the entire image or blurring the entire image, cannot be used to create these feature specific variations in training images. Instead, a more advanced image feature transfiguration technique must be developed.

The image generator 105 is trained to automatically generate augmented training image data using initial training image data, or augmented testing image data or initial testing image data. For a particular initial image, the image generator 105 generates one or more augmented images by applying a type of transformation. For each type of transformation to be applied during training or testing, the image generator 105 generates multiple augmented images by applying the transformation on the initial image. The image generator 105 generates multiple realistic variants of test cases using transformations that, for example, impose advanced morphing of individual objects, image characteristics, or other aspects of the initial image. For example, the image generator 105 may apply a transformation that adds eyeglasses of various makes to a subject-persons face in the initial image with very realistic results. Training and implementing the image generator 105 includes training and implementing software tools or machine-learning architectures that generate feature-transformed photorealistic images for an initial set of test cases.

In some embodiments, development of these software tools or components of the image generator 105 comprises, for example, training semantic rule-driven generative AI models for image-to-image translation or transformation. These component tools of the image generator 105 are trained for transforming an initial image from one rule-driven semantic instance map to another rule-driven semantic instance map. Since the initial set of image data are already labeled in the STAR database 104 or image database 106, the image generator 105 may create the augmented images and automatically label the augmented images using the initial labels associated with the initial image data. The STAR server 102 may reference and implement the transformations, initial dataset, and augmented image dataset when developing the testing engine 103, such as developing the robustness metrics to measure the accuracy of the RCMs 131 when training and developing the RP module 123.

In some implementations, the STAR server 102 trains and develops the AI models of the image generator 105 for feature-level transformation generation. The STAR server 102 need not require a one-to-one mapping of paired pre-transformed and post-transformed data for training but may rely on the much less expensive alternative of two groups of images with varying semantics encoding the transformation to be performed.

The synthetic feature-level image transformations of the image generator 105 will be implemented using generative AI models across multiple tasks or types of transformations. For instance, the image generator 105 trains and applies AI models that, for example, apply feature-level transformation for face datasets to develop transformations over feature-level semantics of face datasets; apply instance-level transformation for domain-specific images to produce instance or object-level transformations to image semantics within the types of transformations or domains; and apply background-style transformation for domain-specific images to produce background-style transformations to image semantics within each of the domains.

In some cases, the STAR server 102 trains the image generator 105 to include facial-feature generative AI models for applying the feature-level transformation on face datasets in the image data. The facial-feature generative AI models produce feature-level semantic variants in the image data of particular image (e.g., training image, test image), where the particular image includes one or more subjects' faces. The image generator 105 applies the trained facial-feature generative AI models for use in robustness testing of face recognition MUTs. For instance, the image generator 105 applies the facial-feature generative AI models on the training images to train the RCM 131 for evaluating the face recognition MUT. Given a test case comprising an initial face image corresponding to a specific subject-person's identity, the face-feature generative AI models of the image generator 105 may synthesize or transform the initial image to generate one or more photorealistic augmented images with various semantic variations in, for example, the subject's age, facial expression, the subject's pose, makeup, and accessories (e.g., eyeglasses, sunglasses, hats). When the STAR server 102 trains the facial-feature generative AI models to affect these feature variations, the image generator 105 or the testing engine 103 evaluates the resulting augmented images created from any number of test cases using certain metrics, such as the Inception Score (IS) and Fréchet Inception Distance (FID), to validate the synthesis quality of the facial-feature generative AI models of the image generator 105. The STAR server 102 determines that the facial-feature generative AI models of the image generator 105 are trained when the one or more metrics satisfy a training threshold.

In some cases, the STAR server 102 trains the image generator 105 to include instance-level generative AI models for applying instance-level transformations for domain-specific image datasets. The instance-level generative AI models of the image generator 105 are trained to produce instance-level or object-level transformations within the images (e.g., training images, testing images) for use in robustness testing of image-classification MUTs and/or object-detection MUTs. Given a test case specific to one or more domains and a corresponding semantic instance segmentation mask, indicating spatial configuration rules for objects within the image, the STAR server 102 trains the instance-level generative AI models to synthesize and apply transformations on the initial image data to generate various photorealistic images with object-level variations, such as object translation, object scaling, object addition, and object removal, among others. For instance, the image generator 105 references the semantic labels of the initial image as rule-based maps as inputs to the instance-level generative AI models that produce generation of transformed images on another semantic map of the resulting augmented image. When the STAR server 102 trains the instance-level generative AI models to affect these feature variations, the image generator 105 or the testing engine 103 evaluates the resulting augmented images created from any number of test cases using certain metrics, such as the Inception Score (IS) and Fréchet Inception Distance (FID), to validate the synthesis quality of the instance-level generative AI models of the image generator 105. The STAR server 102 determines that the instance-level generative AI models of the image generator 105 are trained when the one or more metrics satisfy a training threshold.

In some cases, the STAR server 102 trains the image generator 105 to include background-style generative AI models for applying background style transformation for domain-specific images. The background-style generative AI models are trained to apply background-style transformations in an initial image to produce the background-style transformations in one or more augmented images, which the STAR server 102 uses in robustness testing of image-classification MUTs and/or object-detection MUTs. Given a test case including an initial image conforming to a certain background style and a corresponding augmented image with the background style to be transferred to, the background-style generative AI models are trained to synthesize and transform the background-style features of the initial image to generate one or more photorealistic augmented images having the background style-level variations, such as weather condition transfer and season transfer, among others. For instance, the image generator 105 references the semantic labels of the initial image as rule-based maps as inputs to the instance-level generative AI models that produce generation of transformed images on another semantic map of the resulting augmented image. When the STAR server 102 trains the background-style generative AI models to affect these background-style variations, the image generator 105 or the testing engine 103 evaluates the resulting augmented images created from any number of test cases using certain metrics, such as the Inception Score (IS) and Fréchet Inception Distance (FID), to validate the synthesis quality of the background-style generative AI models of the image generator 105. The STAR server 102 determines that the background-style generative AI models of the image generator 105 are trained when the one or more metrics satisfy a training threshold.

After training the image generator 105, the STAR server 102 may store the trained image generator 105 or respective AI models into the STAR database 104 or image database 106. When the testing engine 103 or image generator 105 applies the various types of transformations (e.g., for training the RCM 131, or when testing the MUT), the STAR server 102 may reference and apply the image generator 105 or the respective AI models configured for applying the types of transformations on image data. The STAR server 102 may also store the outputted augmented images and the initial images into the STAR database 104 or the image database 106.

Figure 2:
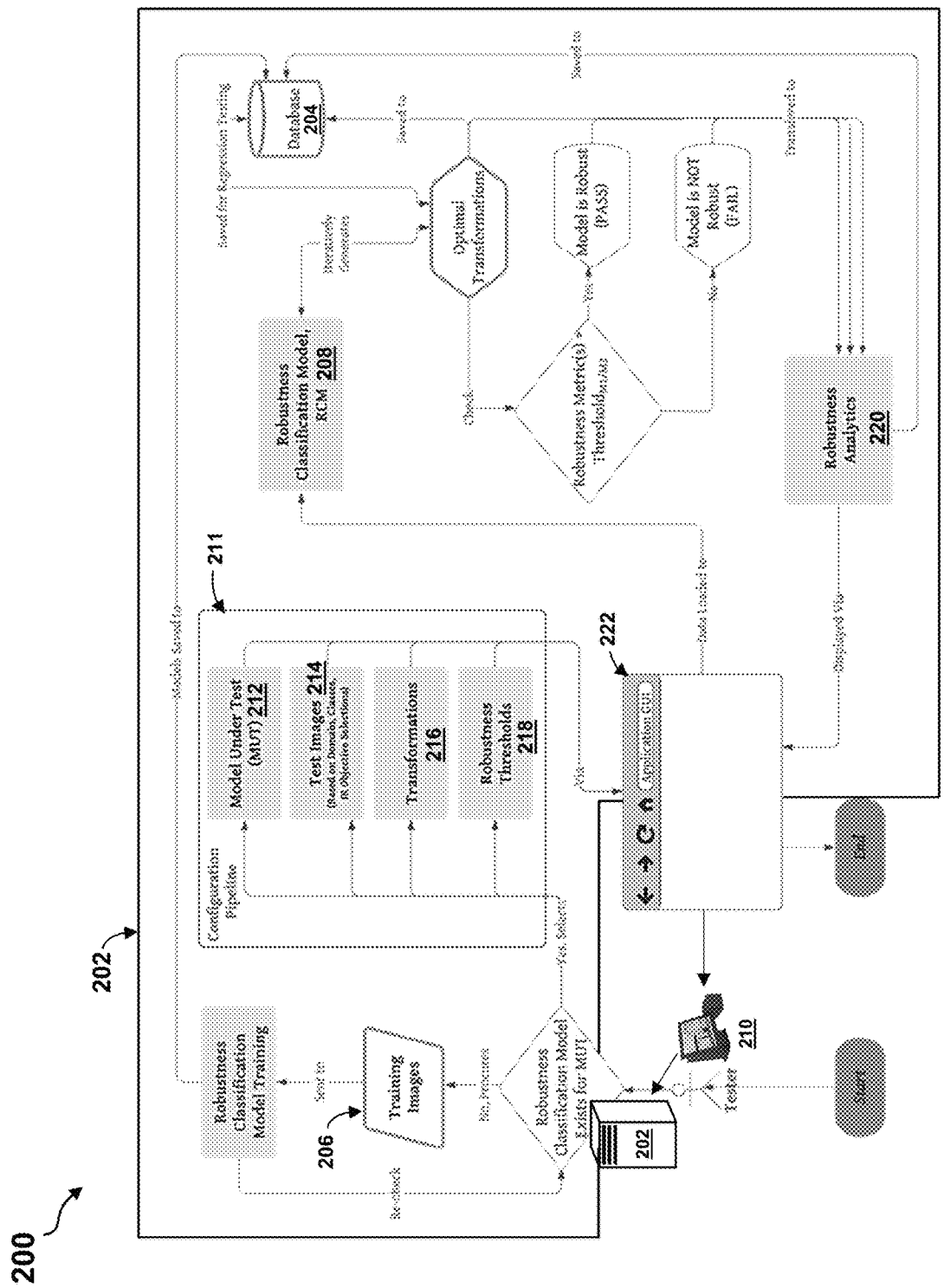
FIG. 2 shows dataflow amongst components of a system for testing robustness of MUTs when operated by a tester, according to an embodiment.

FIG. 2 shows dataflow amongst components of a system 200 for testing robustness of MUTs when operated by a tester, according to an embodiment. The system 200 includes a server 202 (e.g., STAR server 102), a database (e.g., STAR database 104, image database 106), and a client device (e.g., tester device 110) accessing the server 202 via one or more networks to configure the STAR server 102 for testing an image-processing MUT 212 of the tester.

The servers 202 and client devices 210 may include any type of computing device comprising hardware and software components for performing the various processes and tasks described herein. For example, the server 202 comprises one or more computing devices having computing software programming defining various machine-learning architectures for developing test cases for testing the robustness of MUTs 212. As another example, the client device 210 includes software programming defining a software application (e.g., native installed application, web browser) for accessing features and functions of the server 202, which may include a user interface 222 allowing a tester-user to interact with and configure the testing features and functions of the server 202 for testing the tester's MUTs 212. Similarly, the databases 204 may be hosted on any computing devices having hardware (e.g., non-transitory machine-readable storage media) and software components capable of hosting the various types of data (e.g., training image data 206, test image data 214) and performing the various processes and functions of the databases 204 described herein. The databases 204 of the system 200 may store, for example, the image data (and metadata) of training images 206, MUTs 212, image data (and metadata) of test images 214, various types of transformations 216, trained or untrained RCMs 208, and report output data generated by a RA module 220, among other types of data and information.

The server 202 uses a set of testing parameters for generating a test configuration pipeline 211. The configuration pipeline 211 is a data structure or pointers that are based upon and include the testing configurations and parameters used by the server 202 for testing a MUT 212. For example, the configuration pipeline 210 includes, for example, the software programming of the MUT 212, a image data for a set of test images 214, a pool of transformations 216 to apply against the test images 214, and objective thresholds or robustness thresholds 216 for determining various analytics and metrics. In some cases, the server 202 receives certain components of the configuration pipeline 210 from the client device 210, via the user interface 222, in the form of the tester's configuration instructions. For instance, the tester may upload or select one or more MUTs 212 or one or more test images 214. Additionally or alternatively, in some cases, the server 202 automatically determines certain components of the configuration pipeline 210 according to the configuration instructions received from the client device 210 via the user interface 222. For instance, the testing configuration instructions entered by the tester may indicate a domain of the MUT 212. The server 202 then automatically selects test image data 214 or transformations 216 relevant to the particular domain from the database 204 for testing the MUT 212.

In operation, the tester operates the user interface 222 of the client device 210 to access and interact with the testing services hosted and executed by the server 202. The system 200 components allow the tester to use the image processing operations to improve the tester's processes for testing the MUTs 212. In the example embodiment, the tester operates the user interface 222 to instruct the client device 210 to transmit one or more MUTs 212 to the server 202, via one or more networks, for testing. The client device 210 provides the tester's instructions for the server 202 to train and apply a machine-learning architecture on the MUT 212 in order to test the robustness of the MUT 212. The instructions may include various configurations or testing parameters, such as indicating the domain or objective of the MUT 212, among others.

The server 202 receives the configuration instructions from the client device 210 and establishes the configuration pipeline 211 for testing the MUT 212. The configuration instructions indicate the MUT 212 that the tester intends to test. The configuration pipeline 211 includes a testing objective as defined by robustness thresholds 218 that include a threshold of acceptable behavior for robustness and level of desired robustness testing. The tester's configuration inputs may further indicate a number of training images 206 that are representative of the types of images that the MUT 212 is intended to handle. The tester uses the operations of the server 202 to create a test model of the MUT 212, referred to as the RCM 208. The server 202 uses the RCM 208 to predict (classify) a testing outcome and a minimum number of test cases needed to achieve the robustness testing objective of the robustness threshold 218. The tester or the server 202 selects the set of transformations 216 relevant to the MUT's domain from a pool of preconfigured transformations 216 stored in the database 204. In some cases, the tester may instruct the server 202 to avoid or exclude certain types of transformations 216 for the set transformations 216 in the configuration pipeline 211. For example, the tester would exclude transformations 216 related to wearable accessories for non-facial recognition applications.

The server 202 uses training images 206 for training the RCM 208 and/or for testing and evaluating the MUT 212. The training images 206 include an initial set of training images 206 and newly-generated augmented training images 206. The server 202 receives the initial set of training images 206 as input and automatically generates the new augmented training images 206. The server 202 applies the selected set of transformations 216 on the initial training images 206 to create a large number of test cases, displaying (in the augmented training images 206) certain variations of objects or features of the particular initial training image 206. The benefit is that the larger set of test cases can train the RCM 208 to detect and evaluate a larger variety of image changes or degradations by the MUT 212.

In some embodiments, the server 202 determines whether an augmented image data is too distinct or dissimilar from a corresponding initial image data. For instance, in some implementations, the server 202 evaluates the transformed augmented training images 206 using the Fréchet Inception Distance (FID) (or similar image processing metrics), which measures a distance between distributions of real images and synthetic images, to validate photorealism of a newly-generated augmented image in contrast to a corresponding initial image. If the server 202 determines that the distance is too large and fails a similarity or objective threshold, the transformed augmented images are discarded, and the server 202 repeats the image-generation operations with a new set of augmented images and/or a new set of initial images. If the server 202 determines that the augmented images meet the FID criteria and satisfy a similarity threshold, then the server 202 may store the initial image data (e.g., initial training images 206, initial test images 214) and the augmented image data (e.g., augmented training images 206, augmented test images 214) into the database 204. The server 202 may further store the image data along with labels and metadata from the initial image data for use in development and training of the RCMs 208. The server 202 may display the augmented images and/or the initial images on a dashboard user interface 222 for the tester to view. The server 202 may use the training image data 206 (e.g., initial training image data 206, augmented training image data 206) to automatically train a RCMs 208 having a pre-defined machine-learning architecture developed for a domain and objective related to the MUT 212.

The tester may indicate and/or upload the MUT 212 for the server 202 to generate test cases that test the robustness of the MUT 212 with respect to types of transformations 216. To evaluate the robustness of the MUT 212, the server 202 applies a RCM 208 trained to classify the robustness or vulnerabilities of the MUT 212 with respect to the types of transformations 216. The tester indicates a testing objective defined by the robustness threshold 218, representing the threshold of acceptable behavior for robustness and the level of desired robustness testing. The tester indicates and/or uploads the training images 206 that are representative of the types of images that the MUT 212 is intended to handle in ordinary operations. The tester instructs the server 202 to retrieve or generate the RCM 208 a test model of the MUT 212. The RCM 208 is trained to predict (classify) the testing outcome and the minimum number of test cases needed to achieve the robustness testing objective. If the server 202 determines that the RCM 208 exists in the database 204 or received from the client device 210, then the server 202 proceeds to initiate the testing process using the configuration pipeline 211 and configuration instructions from the tester. If the server 202 does not receive a trained RCM 208 from the client device 210 or determines that a trained RCM 208 is not in the database 204, then the server 202 trains the RCM 208 using the training images 206 according to the tester's configuration instructions and/or the configuration pipeline 211. Further description and examples of training an RCM 208 is provided in FIG. 3 below.

When the tester initiates the testing process, the server 202 automatically feeds each the test image data 214 (e.g., initial test image data 214, augmented test image data 214) to the MUT 212 trained for object recognition. The MUT 212 is applied to the test image data 214 and outputs one or more predicted object classifications. The server 202 determines whether the MUT 212 passed or failed the robustness detection test based upon the MUT's 212 outputted predicted classification of the test image data 214. A RA module 220 evaluates the accuracy of the MUT 212 outputs relative to certain types of transformations 216 and generates various reports. The RA module 220 may detect potential robustness vulnerabilities in the MUT 212 corresponding to types of transformations 216. In some cases, the server 202 uses the results of the RA module 220 to automatically generate new test image data 214 to further evaluate the vulnerabilities of the MUT 212. The automated testing process stops when the testing objectives are met. The tester can store test cases and results into the database 204 for future regression testing.

The server 202 computes the set of transformations 216 that generated the augmented training image data 206 or the augmented test image data 214 when determining the robustness of the MUT 212. The RCM 208 is trained to classify the robustness of the MUT 212 relative to the types of the transformations 216. The RA module 220 may output these transformations 216 in the user interface 222. In some implementations, based on the identified set of transformations 216, the tester may optionally instruct the server 202 to use a much larger set of training images 206 or test images 214 to rerun a scaled-up testing process on the MUT 212.

The server 202 may generate and output to the tester, via the user interface 222, the report containing various types of information about the testing session. Non-limiting examples of the types of report information includes the test cases (e.g., the test images 214 and types of transformation 216 of the test images 214 that the MUT 212 was applied on) that the MUT 212 passed or failed, the predicted classification by the MUT 212, the time taken for the MUT 212 to predict the testing outcome, the actual testing time for the MUT 212, and the least number of transformations needed for the RCM 208 to classify robustness to determine changes in robustness between different versions of the MUT 212, among others. The output report may include various analytics generated by the RA module 220 containing information related to the robustness behavior of the MUT 212 on, for example, a test image 214, classifications, transformations 216, and overall MUT 212 model level performance.

In some circumstances, the tester may provide a new or updated version of the MUT 212 to the server 202 for testing. For instance, if the MUT 212 has been retrained extensively, then the previously generated test cases in the database 204 may be outdated or requires additional complementary test cases. The tester can may optionally instruct the server 202 to generate new test cases of new augmented test images 214 with the same or different set of transformations 216, where the server 202 proceeds through the series of operations again. In some implementations, the tester can use the server 202 for regression testing by rerunning the baseline test cases for updating certain metrics, such as the minimum amount of transformations 216.

Figure 3:
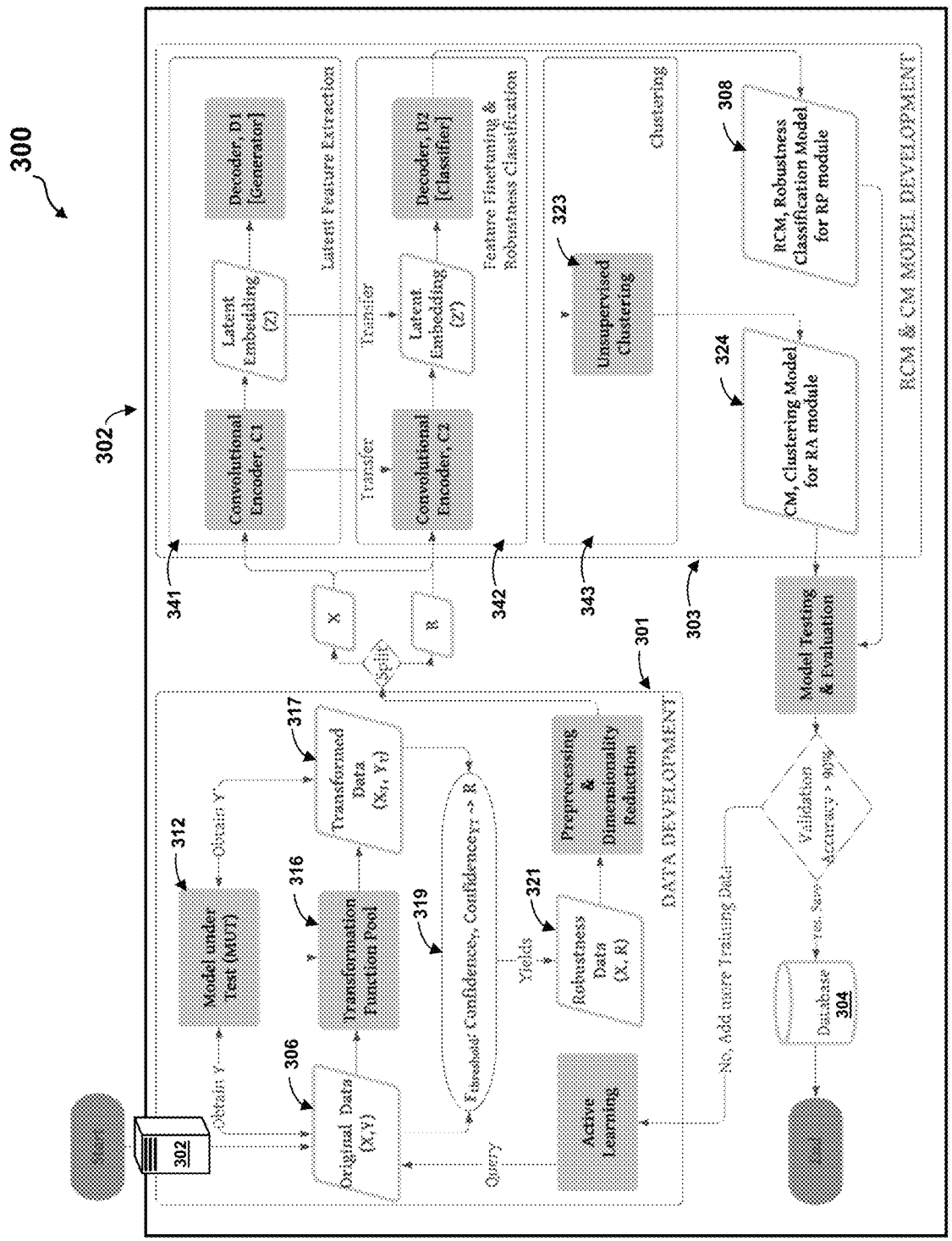
FIG. 3 shows dataflow amongst components of a system for developing a testing engine for testing robustness of MUTs, according to an embodiment.

FIG. 3 shows dataflow amongst components of a system 300 for developing a testing engine for testing robustness of MUTs, according to an embodiment. The system 300 may perform the functions and features of FIG. 3 during a training operational status phase and/or testing operational status phases. Moreover, in some embodiments, the system 300 may perform the functions and features of FIG. 3 during RP Module Development functions and/or during RA Module Development functions.

The system 300 includes a server 302 (e.g., STAR server 102), and a database 304 (e.g., STAR database 104, image database 106) accessible to the server 302 via one or more networks to configure the server 302 for testing an image-processing MUT 312 of a tester. The server 302 develops, trains, and tests components of the testing software programming and data structures in several phases in several logical blocks of software functions, including data development functions 301 and model development functions 303.

In the data development functions 301, the server 302 automatically develops and trains various types of datasets or data structures, including developing image datasets 306 for training the RCM 308 and testing the MUT 312.

A DTP module (or other software component of the server 302) obtains an original image dataset 306 and optionally applies the MUT 312 to obtain corresponding labels (represented as X, Y; where X references the images, and Y references the target labels from the MUT 312). The DTP module then applies transformations 316 on the initial image data 306 to generate augmented transformed images 317 and optionally applies the MUT 312 on the augmented transformed image data 317 to obtain corresponding labels (represented as X', Y'; where X' references the transformed images, and Y' references the target labels from the MUT 312). The DTP module applies a pool of transformations 316 relevant to the domain of the MUT 312.

Using a preconfigured, threshold-driven robustness evaluation function 319, the DTP module compares the target metadata labels (e.g., Y' are compared against Y) to generate robustness data 321 comprising a multi-label, one-hot robustness column vector (R) corresponding to each initial image (X) or augmented image (X'). In the robustness data 321, the rows of the robustness column vector (R) represent robustness values for each of the corresponding transformations of the pool 316 applied on the original image data 306. In some cases, the function 319 provides a robustness value of '1' if the MUT 312 is robust to the transformation or features of the initial image 306 or augmented image 317, and '0' if not.

The (X, R) data map of the robustness data 321 is then passed on to the model development functions 303 for training and evaluating the RCM 308 and RP module. The model development functions 303 include operations for developing and training RCMs 308 and clusters 324. The server 302 develops, trains, and validates an RCM 308 for evaluating the MUT's 312 robustness towards types of transformations applies on images using a trained classifier-decoder (D2). A latent feature extraction engine ("feature extractor") includes an encoder (C1) trained to extract latent feature vector embeddings (Z, Z') using latent features extracted from the input image data (X). The RCM 308 is trained to analyze the latent feature vector embeddings (Z, Z') based on the latent features of the images that may affect the MUT's 312 robustness behavior towards the images, where the RCM 308 uses the extracted feature embeddings (Z') as inputs for generating the robustness prediction.

Using the robustness data map (X, R), the server 302 performs the model development phase 303 for the RP module in two functional or operations parts, including Latent Feature Extraction Model (LFEM) Development 341 for latent feature extraction from images using the feature extractor, and Feature Fine-tuning & RCM Development 342 for finetuning the latent features towards a robustness classification objective and producing the RCM 308.

In LFEM Development 341, the server 302 executes functions for latent feature extraction engine ("feature extractor" or "LFEM") comprising machine-learning architecture layers trained to extract various types of features from the image data and/or robustness value. In the example system 300, the feature extractor includes layers of a convolutional encoder (shown as C1 and C2). The 302 uses unlabeled images (X) to develop, train and validate the AI models of the feature extractor 341 for extracting of latent features from the images. Since obtaining unlabeled images is fairly inexpensive, the server 302 may use a large set of domain-specific images to train each corresponding LFEM model of the feature extractor. In some embodiments, the machine-learning architecture of the feature extractor includes the LFEM AI models based upon, for example, one or more implicit density extraction techniques, such as autoencoders (e.g., regularized, sparse, de-noising), variational autoencoders, and generative adversarial networks (GANs). The architecture and models of the feature extractor may include an encoder-decoder architecture, where a convolutional encoder (C1) down-samples dimensionality of the image into a smaller set of latent features in the form of a latent feature embedding (Z). The decoder (D1) includes layers that reconstruct the input image (X) with a minimal loss of information.

Once the autoencoder (C1) model of the feature extractor is trained and optimized for optimal MSE loss reduction, then the server 302 discards or deactivates the decoder (D1) of the feature extractor 341. The server 302 the passes the latent feature embedding vector (Z), trained hyper-parameters or weights, and architecture of the encoder (C1) are passed on to the next functions for developing the RCM 308 for the MUT 312. In some embodiments, the server 302 trains and stores a universal LFEM architecture per domain that will be used for transfer-learning or used directly for an RP module corresponding to an MUT 312 within the same domain without training the LFEM architecture.

During Feature Fine-Tuning and RCM Development functions 342, the server 302 executes for the RM module and/or the RP module. The server 302 executes software programming for fine-tuning the latent feature vector (Z) output by the LFEM encoder (C1). The outputted latent feature vector (Z) may be representative of visual-semantic features causing the lack or presence of robustness in the MUT 312. Accordingly, the server 302 references the latent feature vector (Z) for subsequent development of the RCM 308 for the RP module. The RCM 308 is trained on labeled datasets containing the images (X) and corresponding robustness vectors (R). In some embodiments, since computing the robustness vectors (R) for corresponding images (X) is expensive, the DTP module or other component of the server 302 may implement an active learning approach to start with a small training set and create labeled training data (X, Y; X', Y') for image classes in which the RCM 308 shows unsatisfactory validation metrics. The layers and models trained for feature fine-tuning and RCM 308 may employ an encoder-decoder architecture, where the encoder (C2) performs the same function as the encoder (C1) in prior operations of LFEM Development 341, such that the encoder (C2) is trained to extract a feature embedding vector (Z'). The decoder (D2) is applied on the embedding vector (Z') and solves for the robustness classification objective.

In some implementations, the server 302 copies and transfers the encoder (C1) architecture and weights, along with the latent feature vector (Z), as copied from the previously trained encoder (C1) of the previously developed LFEM feature extractor. This transfer technique may beneficially reduce the amount of robustness-labeled data needed to train the RCM 308 since the encoder (C1) learns a generalized domain-oriented mapping of images to latent features over a much larger set of unlabeled images. The server 302 develops and trains the second decoder (D2) as a classifier of the RCM 308, by applying the decoder (D2) on the latent feature embedding (Z'). The second decoder (D2) is developed and trained to perform the classification function that generates a predicted probabilistic transformation-specific robustness vector (R) for a given input image (X). The architecture of the feature extractor is trained to minimize the cross-entropy loss over multi-label robustness classification objective using the labels (R).

After training and finetuning the encoder (C2) of feature extractor and the classifier-decoder (D2) for the RCM 308 of the RP module, the server 302 may perform an RCM 308 evaluation operation. The server 302 implements a configurable objected or training threshold detection (TD) operation, when training the decoder-classifier (D2) of the RCM 308 to classify outputs of, for example, a sigmoid activation function in a loss layer (or other layer) of the decoder (D2) as being transformation-specific robustness values of 0 or 1 or within a range of 0 to 1. During training, the classifier (D2) is applied to a particular embedding (Z') for an input training image and outputs a predicted classification of the predicted transformation-specific robustness value (0 or 1; 0-1). The loss layer implements the configurable TD technique by computing a loss distance (e.g., L-2 distance) between each of the actual robustness values indicated by the training labels and corresponding predicted robustness values for each actual-to-predicted robustness vector pairs. In some cases, the loss layer (or other software component of the RP module or the server 302) applies a secondary statistical classifier to the robustness vector pairs to find thresholds or an optimal threshold that maximizes sensitivity and specificity, for example, over a receiver operating characteristic (ROC) curve when using the training image data (e.g., initial training image data, augmented training image data).

The server 302 develops and trains an RP module having the trained RCMs 308. The RCMs 308 can be either trained by administrative users or tests or trained automatically by the server 302 on preconfigured domain-specific RCM 308 architectures using preconfigured features. In some cases, the server 302 may provide the preconfigured features or other information for training the RCM 308 to the tester on an interactive dashboard user interface.

After training the RCMs 308, the server 302 may version and store the RCM 308 into the database 304 with metadata containing relevant information on the test cases, MUT 312, and transformations 316 used in the training and evaluation process. The server 302 takes as input a specific combination of the MUT 312, domain-specific images 306 (e.g., queried from a database 304 by a DTP module), and a pool of transformations 316 (e.g., queried from a database 304 by the DTP module). In some cases, the server 302 receives inputs from a tester or administrator that manually filters for relevant types of transformations 316.

The server 302 applies the trained RCM 308, having the corresponding thresholds for the features or transformations, for model testing and evaluation. In some implementations, the server 302 may apply the trained RCM 308 when implementing a metaheuristic-based robustness testing and analytics software module ("RA module") to perform iterative predictive testing over various test cases and corresponding transformations indicated by the tester.

The server applies the trained RCMs 308 resulting from feature extractor 341 and robustness classification development to train and develop a fully automated RA module. The RA module may include an interactive dashboard user interface for testers to review output reports of the server 302 performing the various processes described herein. The dashboard interface displays output information generated by the RA module to provide the tester a detailed understanding of, for example, feature-level (e.g., particular features; types of features) causes for a lack of (or strength for) robustness in the MUT 312 at an image, transformation, class, and overall MUT 312 model level. The RA module generates and structures the robustness analytics information in an easy-to-understand presentation allowing the tester to view and review directly on the dashboard or download in an appropriate format for further communications or configurations over the robustness refinement of the MUT 212. In some cases, the tester operates the dashboard interface to select the test cases for the overall testing process according to the tester's strategy for test case prioritization and selection.

The layers of the trained RCM 308 output the robustness confidence values with respect to the selected transformations for each initial image and augmented image of the test case. The server 302 identifies the transformations needed to accurately quantify the robustness behavior of the MUT 312 according to one or more techniques. The server 302 may reference the optimal confidence threshold (yielding the maximum sensitivity and specificity on the RCM 308 classification results) as generated from the RP module to predict a minimal amount of transformations exposing the MUT's 312 lack of robustness corresponding to the specific test case. Additionally or alternatively, the server 302 may implement user-configurable thresholds entered by the tester during the configuration phase to identify the types of transformations for which the RCM 308 is most confident about the MUT's 312 robustness (the types of transformations causing the RCM 308 to generate the best robustness confidence values for the MUT 312).

The RA module may validate MUT's 312 robustness for certain types of transformations of the pool 316 based upon the robustness confidence scores generated by the RCMs 308 and the robustness thresholds or optimal threshold. The RA module automatically validates the MUT's 312 robustness for certain transformations when the robustness confidence scores are above the thresholds by comparing how the MUT 312 responds to these transformations on the particular initial images or augmented images. The tester may instruct the server 302 to iteratively validate the MUT 312 for each transformation that the RCM 308 generates lower robustness confidence scores for the MUT 312. In some case, the server 302 may impose certain iteration limits, such as computation constraints and time constraints. When the server 308 computes the robustness confidence results on a significant or threshold amount of test cases, the RA module uses the robustness results with respect to the transformations to create the detailed reports about the MUT 312 robustness behavior on, for example, image-level, class-level, transformation-level, and overall MUT 312 model-level.

In some implementations, the server 302 executes an unsupervised clustering module (CM 323) to further help the tester identify robustness patterns of the MUT 312 in a large amount of test image data. The CM 323 uses the fine-tuned robustness behavior encoding latent features (Z'), extracted from the encoder (C2) of the RCMs 308 to train or apply the unsupervised CMs 323 and generate cluster models (clusters 324). The RA module uses the clusters 324 obtained from the CMs 323 to provide an overview on the patterns of the MUT's 312 robustness behavior on a transformation-level and class-level. The image data of the test cases are fed as input to the trained encoder (C2) of the trained RCM 308, which outputs the latent feature vector (Z'). The CM 323 is applied on the latent features (Z') output by the encoder (C2), which the CM 323 takes as input to a k-means clustering algorithm of the CM 323. In some embodiments, for example, the CM 323 uses an elbow method (or similar technique) to determine an optimal amount of clusters 324 needed for clustering the distribution of the latent vector (Z'). In this example, when determining the amount of cluster 324, the CM 323 calculates the Intra-Cluster Sum of Squared Errors (SSE or Inertia) for different combinations of cluster values (k) and then selects the cluster value (k) where the computed inertia begins to diminish. The CM 323 or RA module references the optimal amount of clusters (e.g., k=10) to compute an averaged robustness metric (ARM) for each cluster 324. The cluster-specific ARMs indicate general distributions of transformation-specific robustness behavior of the MUT 312, allowing to the tester to identify patterns around types of transformations at various levels. Additionally, within each cluster 324, the RA module performs an output class-level analysis for the MUT 312, allowing to tester to understand the distribution of classes against specific robustness patterns of the MUT 312. From the clustering analysis results generated by the RA module, and optional two-dimensional latent feature projection analysis results, the RA module beneficially captures broader cluster-defined patterns in robustness behavior of the MUT 312 across the test dataset (e.g., initial test images, augmented test images).

As an example, with reference to FIG. 4, which shows a chart 400 containing results of a k-means clustering and analytics by the CM and RA module. The first column includes cluster labels 402 corresponding to the cluster number. The next 25 columns includes transformation robustness 404, which correspond to whether a given cluster exhibits an averaged robustness ('1') or not ('0') towards each of the 25 transformations. A Majority True Class column 406 refers to which true class label holds the maximal distribution in the cluster, indicating the likely object for the cluster label. A percentage of majority class column 408 refers to the percentage of data points in the cluster belonging to this majority class. A percentage of data points column 410 refers to the percentage of data points from the test image dataset were allocated to the cluster. In this example, the test cases corresponding to cluster number 5 (Majority Class for "Deer"), on an average, indicate the MUT is robust against all transformations except the first transformation, while test cases for cluster number 8 (Majority Class for "Frog") indicate the MUT is robust only against the first transformation. Using the reports generated by the RA module on both the RCM and CM results, the tester can add more test cases to confirm or reject robustness behavior or patterns on targeted areas of strength or weakness and help the MUT development team develop additional training datasets and augmentations to improve the MUT robustness over the transformation, class, and model dimensions. The tester can use these results to deliver targeted feedback to the development team of the MUT as areas to focus.

Turning back to FIG. 3, the database 304 may store various types of image data, trained machine-learning architecture layers or models, and result information, among other types of information about the tester's entire test session. In some cases, the server 302 may reference the stored data of prior MUT testing results for regression testing and comparative analysis between test runs. The RA module may use the stored data to generate full-test reporting, including detailed analytics and metrics of robustness on individual datapoints, classes, and the overall model of the MUT. The stored information provides full traceability between test artifacts across different versions of the models, allowing for reproducibility and comparative analytics.

Figure 5:
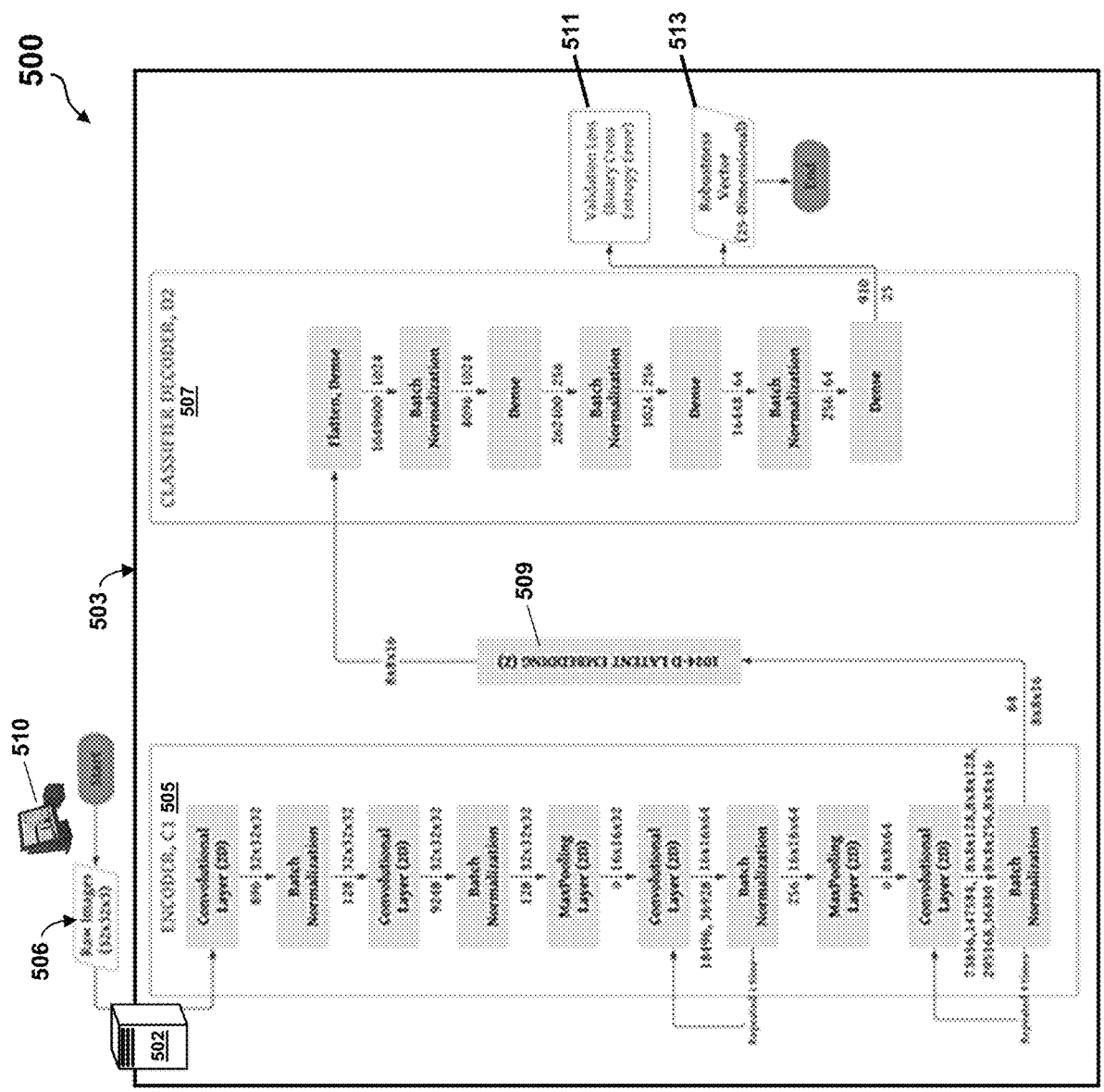
FIG. 5 depicts dataflow amongst components of a system for generating robustness confidence metrics for a MUT, according to an embodiment.

FIG. 5 depicts dataflow amongst components of a system 500 for generating robustness confidence metrics for a MUT, according to an embodiment. The system 500 includes a server 502 (e.g., STAR server 102) and a client device 510 (e.g., admin device 108, tester device 110). The server 502 executes software programming defining layers and functions of one or more machine-learning architectures, including components of an RCM 503 for testing robustness of a MUT for certain types of transformations.

The architecture of RCM 503 includes an encoder 503 (C1) and decoder-classifier 507 (D2) during operations for fine-tuning features and training robustness classification (e.g., RCM-training 342 of FIG. 3). The architecture of the 503 includes a total of about 1.96 m trainable parameters for predicting or generating the robustness metrics of the MUT for a certain image, which may include raw images 506 received from the client device 510 or database. For each synapse between the layers shown in FIG. 5, the text to left/top denotes the shape of the output emerging from the preceding layer and the text to the right/bottom denotes the total number of trainable parameters in the preceding layer.

The RCM 503 may be trained on a training dataset of, for example, 30,000 initial and augmented training images distributed across 5 classes to develop and train an autoencoder-based architecture of the encoder 505 for feature extraction. In a feature extraction training phase (e.g., feature extractor 341 of FIG. 1), the server 502 satisfies a training objective threshold for extracting latent features from unlabeled images with a threshold pixel-wise averaged mean squared validation loss (MSE) that meets the training threshold. The encoder 505 architecture down-samples a raw image from a resolution of 32×32×3 to output a 1024-dimensional vectorized representation of latent features (a latent feature embedding vector 509). In the feature extraction training phase, an initial decoder (not shown) uses the latent feature embedding 509 to reconstruct or up-sample the original raw image to the true dimensions.

The RCM 503 architecture includes the encoder 505 architecture and weights from an autoencoder model. The encoder 505 architecture comprises a 15-layered fully convolutional network with two convolution filters of 3×3×32 (where the kernel size is 3×3 over 32 filters), followed by a 2×2 max-pooling layer, two 3×3×64 convolutional layers, a 2×2 max-pooling layer, two 3×3×128 convolution layers, one 3×3×256 convolutional layer, and one 3×3×16 convolutional layer. The 1024-dimensional latent feature vector output 509 from the encoder 505 is passed on to the initial decoder. The initial decoder includes a 15-layered fully convolutional decoder architecture comprising two 3×3×128 convolutional layers, followed by two 3×3×64 convolution layers, two 3×3×32 convolutional layers, a 2×2 up-sampling layer and one 3×3×3 convolutional layer; producing a 32×32×3 reconstructed image. The encoder 505 and the initial decoder architectures are interspersed with Rectified Linear Unit (ReLU) activations and batch normalization layers to add regularization capabilities as necessary.

The server 502 tunes the encoder 501 to reduce the differences between the initial raw image and reconstructed image. The server 502 then disables or discards the initial decoder and proceeds to the fine-tuning features and training robustness classification functions for training the decoder 507 of FIG. 5. The 1024-dimensional latent feature embedding vector outputs 509 from the encoder 505 are passed on to the decoder 507 to train the classifier-decoder 507 features of the RCM 503. The decoder 507 includes a 7-layered architecture containing four dense (fully-connected) layers with an output dimensionality of 1024, 256, 64, and 25, respectively. The dense layers are interspersed with batch normalization layers to add regularization capabilities as necessary. The network architecture of the decoder 507 uses a training dataset of, for example, 10,000 initial and augmented training images distributed across 5 classes and is trained to minimize a binary cross-entropy loss 511 between actual robustness vector outputs and predicted robustness vector outputs 513.

Figure 6:
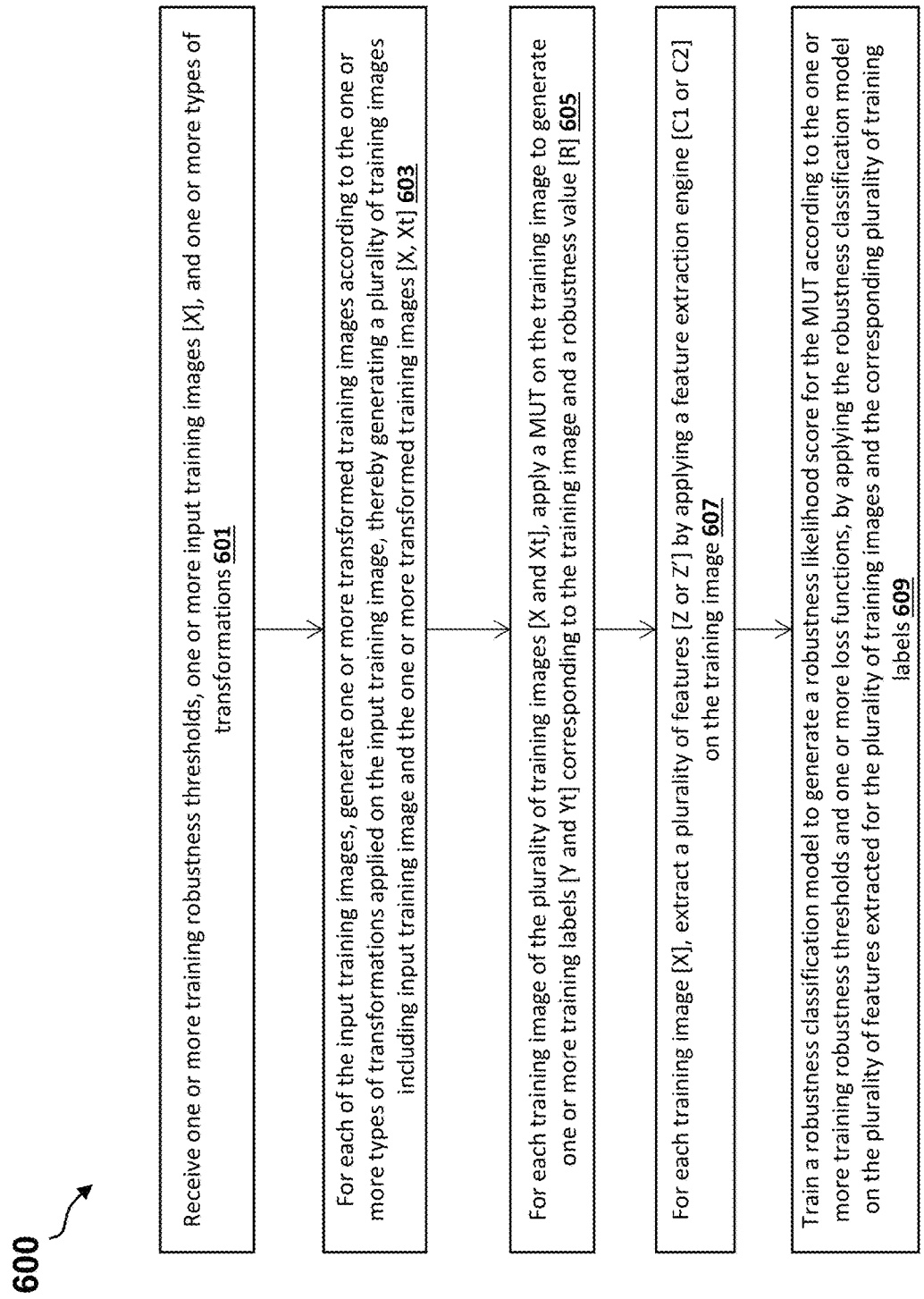
FIG. 6 shows operations of a method for determining robustness of machine-learning architectures having AI-based IR models, according to an embodiment.

FIG. 6 shows operations of a method 600 for using machine-learning architectures having AI models for determining robustness (e.g., RCMs 131) of machine-learning architectures having AI-based IR models (e.g., MUTs) or other image-processing operations. A server (e.g., STAR server 102) performs the operations of the method 600 by executing machine-readable software code that includes layers and functions of one or more machine-learning architectures, though embodiments may include any number of computing devices or any type of computing device that perform the various operations of the method 600. Embodiments may include additional, fewer, or different operations than those described in the method 600.

In operation 601, the server receives one or more training robustness thresholds, one or more input training images (e.g., initial training images (X) in FIG. 3), and one or more types of transformations. In operation 603, for each input training image ($X_n$), the server generates one or more transformed training images ($X'_t$) according to the one or more types of transformations (T), where the server applies the transformation(s) on the input training image, thereby generating a plurality of training images ($X_n$ and $X'_t$), including the transformed training images ($X'_t$) and the initial training images ($X_n$).

In operation 605, for each training image of the plurality of training images [X and X'], the server applies a MUT on the training image to generate one or more training labels [Y and $Y'_t$] corresponding to the training image (X or X') and a robustness value [R]. In operation 607, for each training image, the server extracts a plurality of latent feature vector embeddings [Z or Z'] by applying an autoencoder or encoder [C1 or C2] of a feature extraction engine of an RCM on the40rainingg image.

In operation 609, the server trains an RCM to generate a robustness likelihood or confidence score for the MUT, according to the one or more training robustness thresholds and one or more loss functions. The server applies the RCM on the plurality of latent features extracted for the plurality of training images and the corresponding plurality of training labels. The loss functions in the lost layers adjusts or tunes the robustness likelihood score in accordance with the one or more robustness thresholds. Additionally or alternatively, the loss functions adjust or tunes the hyper-parameters or weights of the RCM or other layers of the machine-learning architectures based upon the robustness thresholds.

Figure 7:
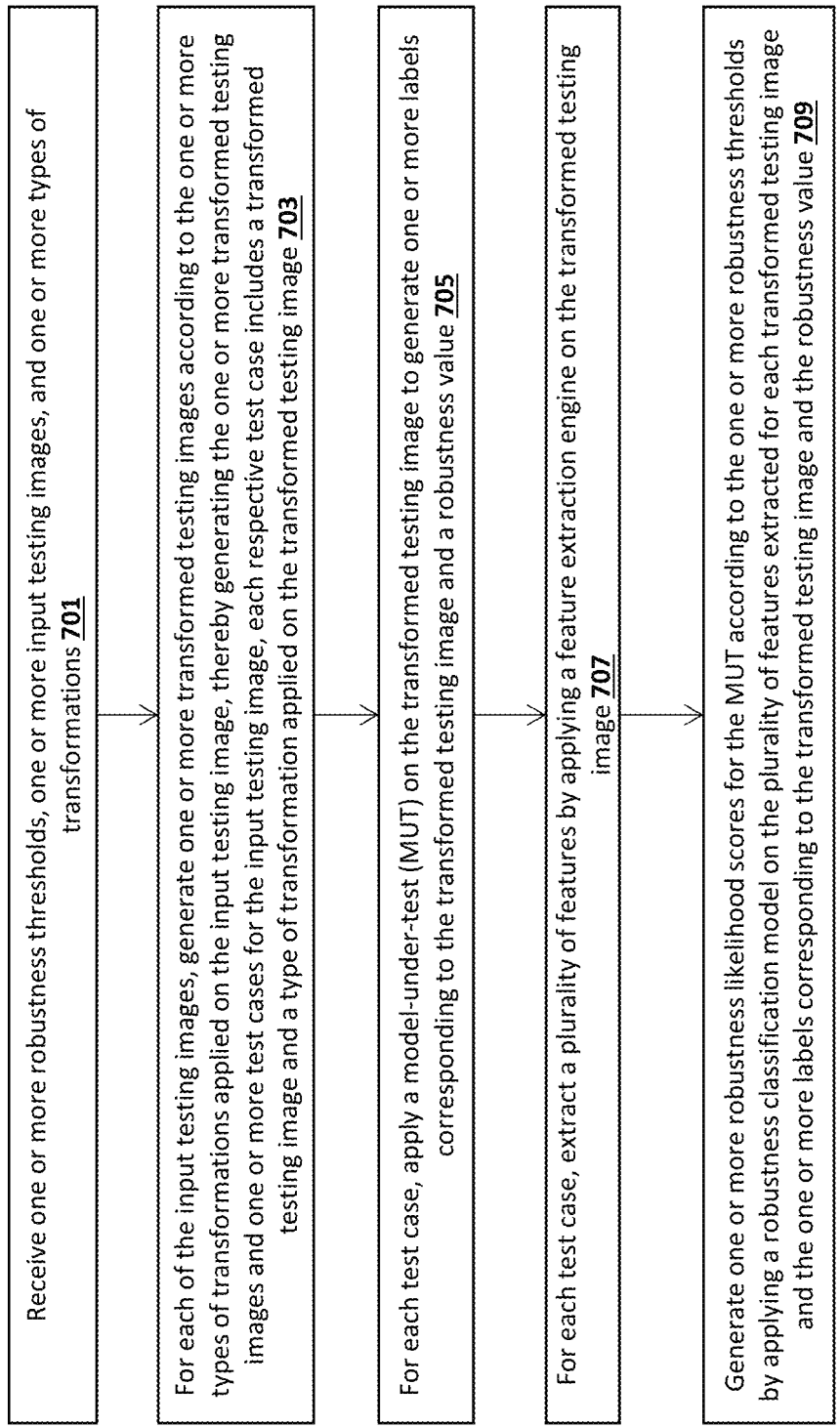
FIG. 7 shows operations of a method for determining robustness of machine-learning architectures having AI-based IR models, according to an embodiment.

FIG. 7 shows operations of a method 700 for using machine-learning architectures having AI models for determining robustness (e.g., RCMs 131) of machine-learning architectures having AI-based IR models for object or feature recognition (e.g., MUTs) or other image-processing operations. A server (e.g., STAR server 102) performs the operations of the method 700 by executing machine-readable software code that includes layers and functions of one or more machine-learning architectures, though embodiments may include any number of computing devices or any type of computing device that perform the various operations of the method 700. Embodiments may include additional, fewer, or different operations than those described in the method 700.

In operation 701, the server receives one or more robustness thresholds, one or more input testing images, and one or more types of transformations. In operation 703, for each of the input testing images, the server generates one or more transformed testing images according to the one or more types of transformations applied on the input testing image, thereby generating one or more testing images and one or more test cases for the input testing image, each test case indicates a transformed testing image and a type of transformation applied on the transformed testing image.

In operation 705, for each test case, the server applies a MUT on the testing image to generate one or more labels corresponding to the testing image and a robustness value. In operation 707, for each test case, the server extracts a plurality of features by applying a feature extraction engine on the testing image.

In operation 709, the server generates one or more robustness likelihood or confidence scores (and/or other types of robustness metrics) for the MUT according to the one or more robustness thresholds by applying an RCM on the plurality of features extracted for each testing image and the corresponding plurality of labels of each test case.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method of using artificial intelligence models for determining robustness of image-recognition artificial intelligence models, the method comprising:
receiving, by a computer, one or more robustness thresholds, one or more input training images, and one or more types of transformations;
for each of the input training images, generating, by the computer, one or more transformed training images according to the one or more types of transformations applied on the input training image, thereby generating a plurality of training images including input training image and the one or more transformed training images;
for each training image of the plurality of training images, applying, by the computer, a model-under-test (MUT) on the training image to generate one or more training labels corresponding to the training image and a robustness value;
for each training image, extracting, by the computer, a plurality of features by applying a feature extraction engine on the training image; and
training, by the computer, a robustness classification model to generate a robustness likelihood score for the MUT according to the one or more robustness thresholds and one or more loss functions, by applying parameters of the robustness classification model on the plurality of features extracted for the plurality of training images and the corresponding plurality of training labels, and adjusting the robustness likelihood score in accordance with the one or more robustness thresholds.

2. The method according to claim 1, further comprising:
receiving, by the computer, from a client computer, an input testing image and a selection of the one or more types of testing transformations;
generating, by the computer, one or more test cases by applying the one or more types of testing transformations on the input testing image, thereby generating one or more transformed testing images for the one or more test cases, each respective test case of the one or more test cases includes a transformed testing image of the one or more transformed test images and a type of testing transformation applied to the testing image;
for each test case, applying, by the computer, the MUT on the transformed testing image of the test case to generate one or more labels corresponding to the transformed testing image and a robustness value;
for each test case, extracting, by the computer, a plurality of features by applying the feature extraction engine on the transformed testing image; and
generating, by the computer, one or more robustness likelihood scores for the MUT by applying the robustness classification model on the plurality of features extracted for each transformed testing image and the one or more labels corresponding to the transformed testing image and the robustness value.

3. The method according to claim 2, further comprising determining, by the computer, an amount of transformations for testing the MUT based upon one or more robustness thresholds obtained with the input testing image.

4. The method according to claim 1, wherein applying the MUT on each particular training image to generate the robustness value corresponding to each training label includes:
for each input training image, generating, by the computer, a robustness vector comprising one or more robustness values based upon comparing the training label of the input training image against each training label of each transformed training image generated for the input training image.

5. The method according to claim 1, wherein training the robustness classification model includes:
down-sampling, by the computer, dimensionality of the training image according to a set of neural network layers defining an encoder of the feature extraction engine;
extracting, by the computer, a first instance of the set of features for the training image;
up-sampling, by the computer, the dimensionality of the training image by applying a set of neural network layers defining a generative decoder, thereby generating a reconstructed training image; and
adjusting, by the computer, one or more parameters of the feature extraction engine according to a loss function using the reconstructed training image.

6. The method according to claim 5, wherein training the robustness classification model further includes:
down-sampling, by the computer, dimensionality of the training image according to the set of neural network layers defining the encoder of the feature extraction engine;
extracting, by the computer, a second instance of the set of features for the training image;
applying, by the computer, a set of neural network layers defining a classifier decoder of the robustness classification model, to generate the robustness likelihood score; and
adjusting, by the computer, one or more parameters of the feature extraction engine according to a second loss function using the robustness likelihood score and the training label corresponding to the training image.

7. The method according to claim 6, wherein training the robustness classification model further includes:
determining, by the computer, that the robustness classification model satisfies a training threshold based upon a distance between the robustness likelihood score predicted for the features extracted for the training image and the training label.

8. The method according to claim 1, further comprising:
generating, by the computer, one or more clusters by applying a clustering function on the plurality of features extracted for the plurality of training images; and
for at least one training image, determining, by the computer, one or more distance scores between the plurality of features extracted from the at least one training image and the one or more clusters.

9. The method according to claim 1, further comprising receiving, by the computer, the one or more types of transformations via a graphical user interface of a user device, including at least one of a feature-level transformation, an image-level transformation, an instance-level transformation, or a background style transformation.

10. The method according to claim 1, wherein the robustness value of the training label is 0, 1, or within a range of 0 to 1.

11. A computer-implemented method of using artificial intelligence models for determining robustness of image-recognition artificial intelligence models, the method comprising:

receiving, by a computer, one or more robustness thresholds, one or more input testing images, and one or more types of transformations;

for each of the input testing images, generating, by the computer, one or more transformed testing images according to the one or more types of transformations applied on the input testing image, thereby generating the one or more transformed testing images and one or more test cases for the input testing image, each respective test case includes a transformed testing image and a type of transformation applied on the transformed testing image;

for each test case, applying, by the computer, a model-under-test (MUT) on the transformed testing image to generate one or more labels corresponding to the transformed testing image and a robustness value;

for each test case, extracting, by the computer, a plurality of features by applying a feature extraction engine on the transformed testing image;

generating, by the computer, one or more robustness likelihood scores for the MUT according to the one or more robustness thresholds by applying a robustness classification model on the plurality of features extracted for each transformed testing image and the one or more labels corresponding to the transformed testing image and the robustness value.

12. The method according to claim 11, further comprising determining, by the computer, an amount of transformations for testing the MUT based upon the one or more robustness thresholds.

13. The method according to claim 11, further comprising:

generating, by the computer, one or more clusters by applying a clustering function on the plurality of features extracted for the plurality of testing images; and for at least one testing image, determining, by the computer, one or more distance scores between the plurality of features extracted from the at least one testing image and the one or more clusters.

14. The method according to claim 13, further comprising generating, by the computer, a user interface for displaying the one or more robustness likelihood scores for the MUT and the one or more clusters.

15. The method according to claim 11, further comprising receiving, by the computer, the one or more types of transformations via a user interface of a user device, including at least one of a feature-level transformation, an image-level transformation, an instance-level transformation, or a background style transformation.

16. The method according to claim 11, further comprising:

receiving, by a computer, one or more input training images and the one or more types of transformations;

for each of the input training images, generating, by the computer, one or more transformed training images according to the one or more types of transformations applied on the input training image, thereby generating a plurality of training images;

for each training image of the plurality of training images, applying, by the computer, the MUT on the training image to generate one or more training labels corresponding to the training image and a robustness value;

for each training image, extracting, by the computer, the plurality of features by applying the feature extraction engine on the training image; and training, by the computer, the robustness classification model to generate the robustness likelihood score for the MUT according to the one or more robustness thresholds and one or more loss functions, by applying the parameters of the robustness classification model on the plurality of features extracted for the plurality of training images and the corresponding plurality of training labels.

17. The method according to claim 16, wherein the robustness value of the training label is 0, 1, or within a range of 0 to 1.

18. The method according to claim 16, wherein training the robustness classification model further includes:

down-sampling, by the computer, dimensionality of the training image according to a set of neural network layers defining an encoder of the feature extraction engine;

extracting, by the computer, a first instance of the set of features for the training image;

up-sampling, by the computer, the dimensionality of the training image by applying a set of neural network layers defining a generative decoder, thereby generating a reconstructed training image; and adjusting, by the computer, one or more parameters of the feature extraction engine according to a loss function using the reconstructed training image.

19. The method according to claim 18, wherein training the robustness classification model further includes:

down-sampling, by the computer, dimensionality of the training image according to the set of neural network layers defining the encoder of the feature extraction engine;

extracting, by the computer, a second instance of the set of features for the training image;

applying, by the computer, a set of neural network layers defining a classifier decoder of the robustness classification model, to generate the robustness likelihood score; and adjusting, by the computer, one or more parameters of the feature extraction engine according to a second loss function using the robustness likelihood score and the training label corresponding to the training image.

20. The method according to claim 16, wherein training the robustness classification model further includes:

determining, by the computer, that the robustness classification model satisfies a training threshold based upon a distance between the robustness likelihood score predicted for the features extracted for the training image and the training label.

* * * * *